United States Patent
Lee et al.

(10) Patent No.: US 7,535,236 B2
(45) Date of Patent: May 19, 2009

(54) METHOD OF MEASURING THICKNESS OF THIN FILM USING MICROWAVE

(75) Inventors: Sang Young Lee, Gyeonggi-do (KR); Jae Hun Lee, Gyeongsangbuk-do (KR); Hyun Kyung Han, Seoul (KR); Sang Geun Lee, Gyeonggi-do (KR); Byung Woo Park, Seoul (KR)

(73) Assignee: Konkuk University Industrial Cooperation Corp., Seoul (KR)

( * ) Notice: Subject to any disclaimer, the term of this patent is extended or adjusted under 35 U.S.C. 154(b) by 9 days.

(21) Appl. No.: 11/994,247

(22) PCT Filed: Sep. 28, 2006

(86) PCT No.: PCT/KR2006/003878

§ 371 (c)(1),
(2), (4) Date: Dec. 28, 2007

(87) PCT Pub. No.: WO2007/037626

PCT Pub. Date: Apr. 5, 2007

(65) Prior Publication Data

US 2008/0205595 A1   Aug. 28, 2008

(30) Foreign Application Priority Data

Sep. 28, 2005 (KR) .............. 10-2005-0090293
Sep. 28, 2006 (KR) .............. 10-2006-0094520

(51) Int. Cl.
*G01R 27/04* (2006.01)
*G01R 27/32* (2006.01)

(52) U.S. Cl. .............. 324/637; 324/636; 324/642

(58) Field of Classification Search .......... 324/637, 324/636
See application file for complete search history.

(56) References Cited

U.S. PATENT DOCUMENTS 5,268,646 A * 12/1993 Doss ................... 324/633

(Continued)

OTHER PUBLICATIONS

Klein, N., et al., The Effective Microwave Surface Impedance of High-Tc Thin Films, J. Appl. Phys., 67(11): 6940-6945, 1990.

(Continued)

*Primary Examiner*—Diego Gutierrez
*Assistant Examiner*—Jeff Natalini
(74) *Attorney, Agent, or Firm*—Lucas & Mercanti, LLP

(57) ABSTRACT

The present invention relates to a thickness measurement method for thin films using microwaves. In the method, the Q-factors of a dielectric resonator are measured. The effective surface resistance ($R_S^{eff}$) of a superconductor or a conductor film and the loss tangent of a dielectric are determined using the Q-factor. The penetration depth $\lambda$ for the superconductor film is measured using a dielectric resonator with a small gap between the superconductor film at the top of the resonator and the rest. The intrinsic surface resistance of superconductor films for calibration is determined using the measured $R_S^{eff}$ and $\lambda$ while the intrinsic surface resistance of a conductor film for calibration is determined using the measured $R_S^{eff}$ and the nature of the intrinsic surface resistance being equal to the intrinsic surface reactance. The thickness of a superconductor or a conductor film is measured using a relation between the $R_S^{eff}$ and the calibrated intrinsic surface resistance for superconductor films or conductor films.

4 Claims, 18 Drawing Sheets

U.S. PATENT DOCUMENTS

| | | | | |
|---|---|---|---|---|
| 6,366,096 B1 * | 4/2002 | Talanov et al. | .............. | 324/633 |
| 6,989,675 B2 * | 1/2006 | Kesil et al. | .................. | 324/636 |
| 7,285,963 B2 * | 10/2007 | Talanov et al. | .............. | 324/635 |
| 2006/0164104 A1 * | 7/2006 | Tada et al. | .................. | 324/646 |

OTHER PUBLICATIONS

Shen, Z., et al., High Tc Superconductor-Sapphire Microwave Resonator with Extremely High Q-Values up to 90K, IEEE Transactions on Microwave Theory and Techniques, 40(12): 2424-2432, 1992.

* cited by examiner

US 7,535,236 B2

METHOD OF MEASURING THICKNESS OF THIN FILM USING MICROWAVE

TECHNICAL FIELD

The present invention relates, in general, to a method of measuring the thickness of a thin film using microwaves and, more particularly, to a method of measuring the thickness of a thin film using microwaves, which measures the effective surface resistance of a conductor or a superconductor using a microwave dielectric resonator (for a dielectric, a low loss dielectric, such as sapphire or $TiO_2$ (rutile phase), is used) in a $TE_{on1}$ mode (or $TE_{on1+\delta}$ mode), and thus obtains the thickness of a thin film in a non-invasive manner, based on a relational expression between the intrinsic surface resistance and the effective surface resistance of the material for the conductor or the superconductor.

BACKGROUND ART

The thickness of a thin film of a conductor or a superconductor is one of the most important physical quantities to control in growing a thin film of such a conductor or superconductor material. In the case of a superconductor thin film, the magnitude of the effective surface resistance measured in a microwave band varies according to the thickness of the grown superconductor thin film. That is the reason why the thickness of a thin film must be known in order to measure the intrinsic surface resistance of a manufactured superconductor thin film. The magnitude of the critical current also varies according to the thickness of a superconductor thin film. In the case of a superconductor thin film manufactured for a Super-Conducting Quantum Interference Device (SQUID), variation in the critical current of a Josephson junction according to thickness greatly influences the performance of the manufactured SQUID. In the case of a conductor, there is a need to precisely measure the thickness of a conductor thin film from the standpoint of the fact that the resistance of a grown conductor thin film varies according to the thickness thereof. The effective surface resistance, a parameter for microwave applications, also varies according to the thickness of a conductor thin film when microwaves are applied to the conductor.

For reference, when the thickness of a conductor thin film or a superconductor thin film is three times as great as the penetration depth of electromagnetic waves (henceforth referred to as 'the penetration depth') or greater, the effective surface resistance of the thin film has almost the same value as the intrinsic surface resistance thereof. Such an electromagnetic wave penetration depth is given as a function of temperature and frequency in the case of a conductor, and as a function of temperature in the case of a superconductor.

For the measurement of the thickness of a thin film, measurement using Transmission Electron Microscopy (TEM) or Atomic Force Microscope (AFM), measurement using a Scanning Electron Microscope (SEM), measurement using an α-step profilometer, measurement using ellipsometry, etc. have been used. Of these measurement methods, only measurement using ellipsometry is a non-invasive measurement method. It is well known that, if the thickness of a thin film is measured using other methods, the original form of the thin film is deformed. Meanwhile, the measurement using ellipsometry is efficient in measuring the thickness of a insulator thin film or a semiconductor thin film in a non-invasive manner, but is inefficient in that, in the case of a conductor thin film, even if the thickness of a conductor thin film is only several nm or above, the thickness cannot be measured. The reason for this is that the penetration depth of electromagnetic waves into a conductor has a very small value of about several nm in a frequency band of several hundreds of THz, which is the frequency band of light used in ellipsometry.

DISCLOSURE

Technical Problem

Accordingly, the present invention has been made keeping in mind the above problems with ellipsometry measurement, which is a non-invasive thickness measurement method, and an object of the present invention is to provide a non-invasive measurement method, which can obtain the thickness of a conductor thin film or a superconductor thin film in a microwave region, regardless of the type of substrate used to manufacture the thin films.

Technical Solution

In order to accomplish the above object, the present invention provides a method of measuring thickness of a thin film using microwaves, comprising a first step of measuring a Q-factor of a dielectric resonator using a separate network analyzer; a second step of determining an effective surface resistance of a superconductor and a loss tangent (tan δ) of a dielectric using the Q-factor of the dielectric resonator measured at the first step; a third step of measuring the penetration depth at microwave frequencies for the superconductor while the temperature of a superconductor placed on a bottom surface of the dielectric resonator and the dielectric is maintained at a constant temperature, and only a temperature of a superconductor placed as the top plate of the resonator can be changed; a fourth step of calculating an intrinsic surface resistance of a superconductor under test using the effective surface resistance determined at the second step and the electromagnetic wave penetration depth for the superconductor measured at the third step; and a fifth step of measuring an effective surface resistance of a superconductor thin film, a thickness of which is to be measured, using a method at the first step, and calculating the thickness of the superconductor thin film using a relationship between the effective surface resistance and an intrinsic surface resistance of the superconductor thin film.

Preferably, the dielectric may be made of a material having a very low loss tangent (tan δ), such as sapphire or rutile.

Preferably, the dielectric resonator may be a $TE_{0mp}$ mode resonator comprising a dielectric mode having a $TE_{011}$ mode, a $TE_{012}$ mode and a $TE_{021}$ mode.

Preferably, the superconductor may be a high temperature Yttrium Barium Copper Oxide (YBCO) superconductor, and the conductor may be a platinum (Pt) conductor.

BEST MODE

Hereinafter, embodiments of the present invention will be described in detail with reference to the attached drawings.

An apparatus for measuring the intrinsic surface resistance of a superconductor using microwaves and the measurement results thereof according to an embodiment of the present invention are described with reference to FIGS. 1a to 2b.

Figure 1A:
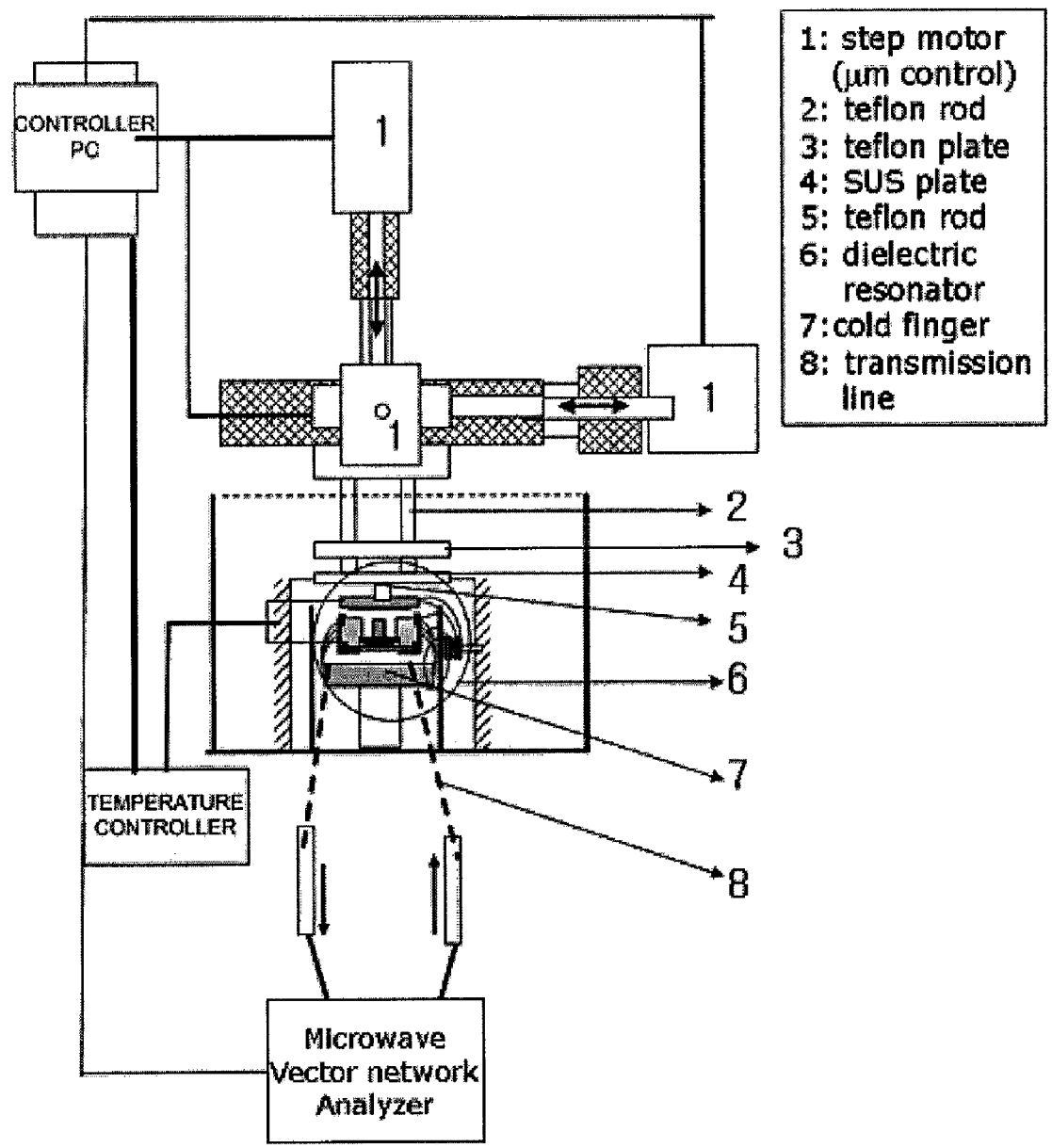
FIG. 1a is a sectional view showing a microwave thin film thickness measurement system for measuring the thickness of a conductor thin film and a superconductor thin film according to an embodiment of the present invention.
Figure 1B:
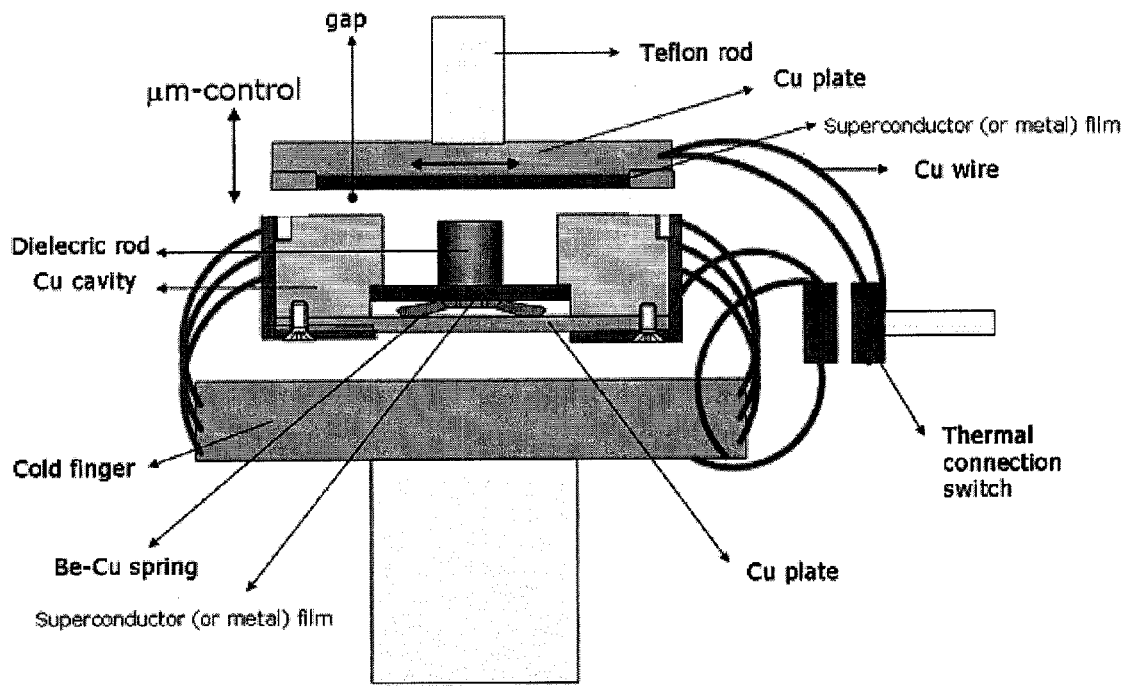
FIG. 1b is a sectional view showing a dielectric resonator for measuring the thickness of a conductor thin film and a superconductor thin film according to an embodiment of the present invention.
Figure 1C:
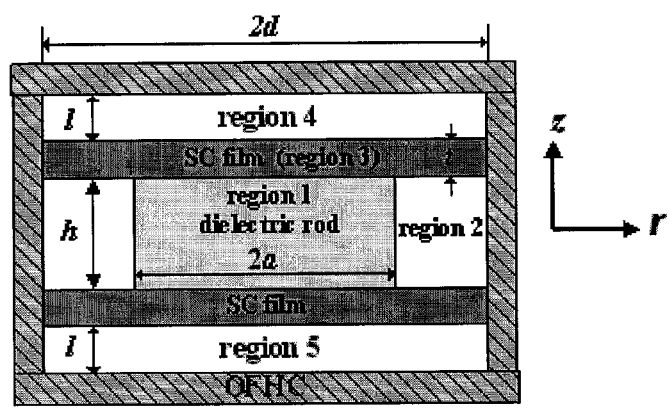
FIG. 1c is a sectional view showing a dielectric resonator for measuring the thickness of a conductor thin film and a superconductor thin film according to an embodiment of the present invention.
Figure 2A:
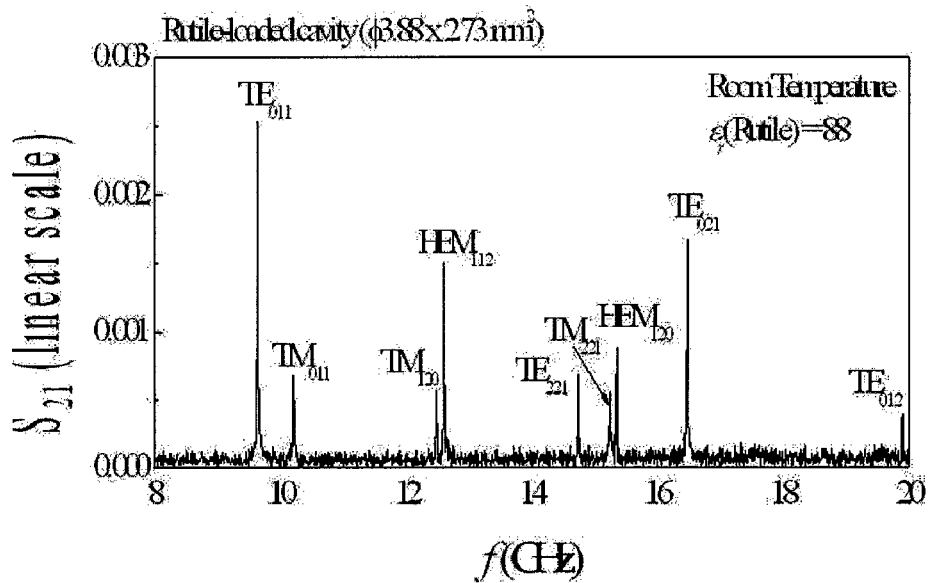
FIG. 2a is a view showing the results obtained by measuring the frequency response of a rutile resonator for measuring the thickness of a superconductor thin film at a temperature of 15 K according to an embodiment of the present invention.
Figure 2B:
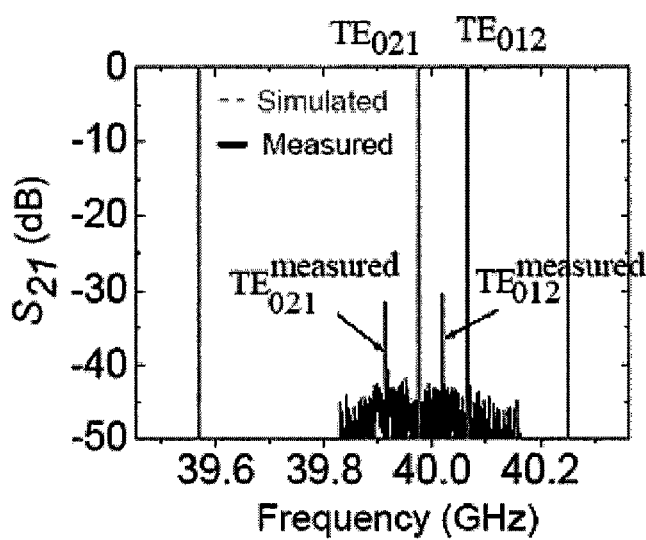
FIG. 2b is a view showing the results obtained by measuring the frequency response of a sapphire resonator for measuring the thickness of a superconductor thin film at a temperature of 15 K according to an embodiment of the present invention.

FIG. 1a is a schematic diagram of a measurement system for measuring the thickness of a superconductor thin film or a conductor thin film according to an embodiment of the present invention, FIG. 1b is a sectional view showing a sapphire resonator or a rutile resonator for measuring the microwave effective surface resistance and effective electromagnetic wave penetration depth for a superconductor thin film (or a conductor thin film), FIG. 1c is a schematic diagram showing a dielectric resonator used to derive a relational expression between the effective surface impedance and the intrinsic surface impedance of the superconductor thin film or conductor thin film, FIG. 2a is a view showing the results obtained by measuring a resonance mode of a rutile resonator having a diameter of 3.88 mm and a height of 2.73 mm at a temperature of 15K according to an embodiment of the present invention, and FIG. 2b is a view showing the results obtained by measuring a resonance mode of a sapphire resonator having a diameter of 5 mm and a height of 2.86 mm at a temperature of 10K according to an embodiment of the present invention.

As shown in FIGS. 1a and 1b, the sapphire resonator according to an embodiment of the present invention is constructed so that, since a small gap of 10 μm between a dielectric, entirely made of sapphire, and a superconductor thin film (or a conductor thin film), placed on a top surface, is used, only the temperature of the superconductor thin film placed on the top surface can be controlled while the temperatures of a superconductor thin film, placed on a bottom surface, and the dielectric are maintained at a constant temperature, at the time of measurement of the electromagnetic wave penetration depth for the superconductor thin film. When the electromagnetic wave penetration depth for the superconductor thin film is measured, sapphire must be used for the dielectric. Since the dielectric constant of rutile is strongly temperature dependent, variation in the dielectric constant becomes large even for small temperature variation, thus rutile cannot be used. The measurement of the effective surface resistance of the superconductor thin film (or conductor thin film) is performed in a state in which no small gap exists between the superconductor thin film (or conductor thin film), placed on the top surface, and the dielectric. In this case, the top superconductor thin film and the rest of the resonator including the dielectric have the same temperature, wherein sapphire or rutile can be used as the dielectric.

As shown in FIG. 1b, the dielectric made of rutile is placed in a center portion of a cavity, and YBCO thin films, which are high temperature superconductors, are placed on the top and bottom surfaces of the resonator. The dielectric has a diameter of 3.88 mm and a height of 2.73 mm, and the cavity has a diameter of 9 mm. The measurement of the electromagnetic wave penetration depth for the YBCO thin films must be performed using a sapphire resonator. In this case, the gap distance between sapphire and the top surface is maintained at 10 μm.

As shown in FIG. 1b, the dielectric made of sapphire is placed in a center portion of a cavity, and YBCO thin films, which are high temperature superconductors, are placed on the top and bottom surfaces of the resonator. The dielectric has a diameter of 5 mm and a height of 2.86 mm, and the cavity has a diameter of 14 mm. When the electromagnetic wave penetration depth for the YBCO thin films is measured, the gap distance between the dielectric and the top surface is maintained at 10 μm.

As shown in FIG. 2a, the $TE_{011}$ mode resonant frequency of the rutile resonator is 9.7 GHz at the normal room temperature, which indicates that there are no other modes coupled to the mode. Meanwhile, the $TE_{011}$ mode resonant frequency of the rutile resonator at a temperature of 77 K is 8.5 GHz, and has a value greatly different from the resonant frequency at the normal room temperature because the dielectric constant of rutile at a temperature of 77 K is about 110, which is much higher than 88, which is the dielectric constant of rutile at the normal room temperature.

As shown in FIG. 2b, the resonant frequency of the sapphire resonator in $TE_{021}$ mode and $TE_{012}$ mode, measured at temperatures ranging from 7 to 90 K, is about 40 GHz. Even though the difference between the resonant frequencies of the two modes is as small as 10 MHz, FIG. 2b shows that there is no mutual coupling between the two modes or coupling to other modes. Therefore, the effective surface resistance of the superconductor thin film and the loss tangent (tan δ) of sapphire can be simultaneously measured using the two modes. The characteristics of the resonator are automatically measured using a computer program.

A non-invasive measurement method of measuring the thickness of a superconductor thin film and a conductor thin film using a rutile resonator or a sapphire resonator for measuring the thickness of a superconductor thin film and a conductor thin film according to embodiments of the present invention is described in detail with reference to FIGS. 3a to 11c.

Figure 3A:
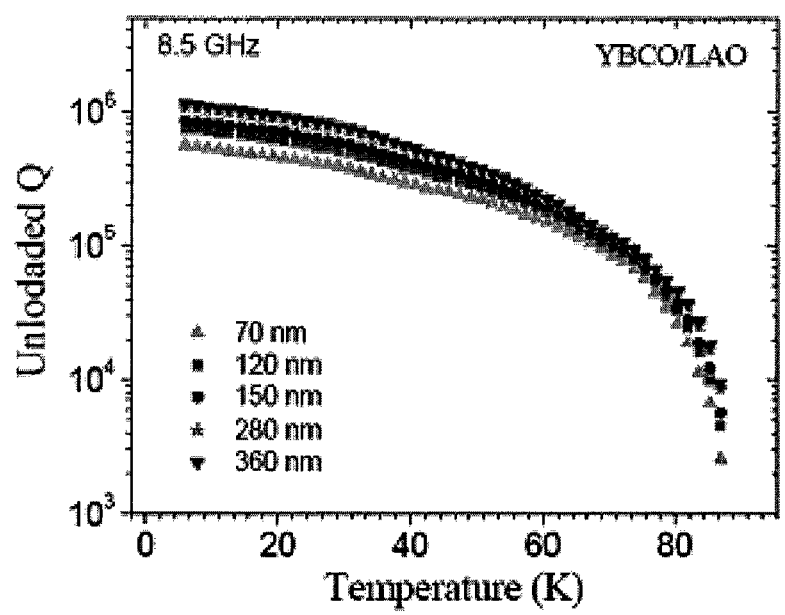
FIG. 3a is a graph showing the temperature dependence of a $TE_{011}$ mode unloaded Q ($Q_0$) measured when YBCO thin films (or YBCO/LAO thin films) having different thicknesses grown on a $LaAlO_3$ substrate are used as the top plate of a rutile resonator, which has a diameter of 3.88 mm and a height of 2.73 mm and in which a rutile-phase $TiO_2$ is used, according to an embodiment of the present invention.
Figure 3B:
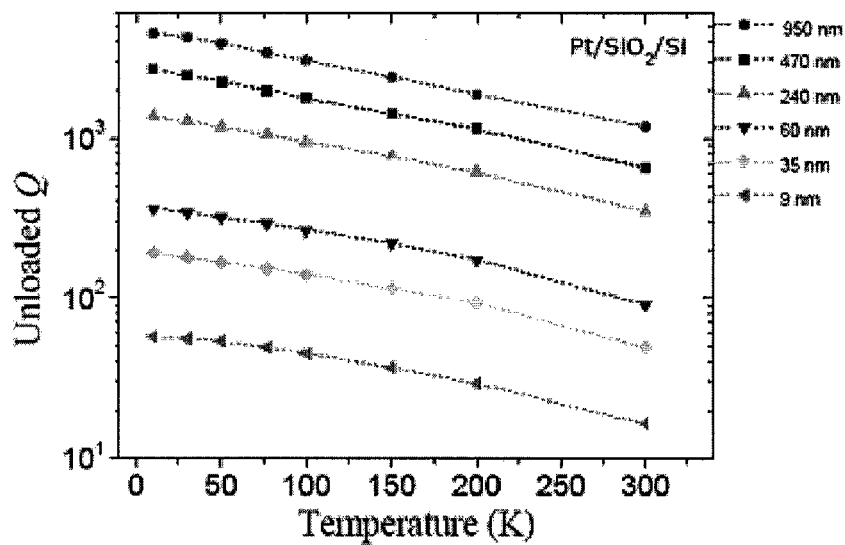
FIG. 3b is a graph showing the temperature dependence of a $TE_{011}$ mode unloaded Q ($Q_0$) measured when Pt thin films having different thicknesses are used as the top plate of a rutile resonator, which has a diameter of 3.88 mm and a height of 2.73 mm and in which a rutile-phase $TiO_2$ is used, according to an embodiment of the present invention (where Pt/$SiO_2$/Si means that a $SiO_2$ layer is deposited on a Si substrate as a buffer layer, and then a Pt thin film is deposited on the $SiO_2$ layer)
Figure 4A:
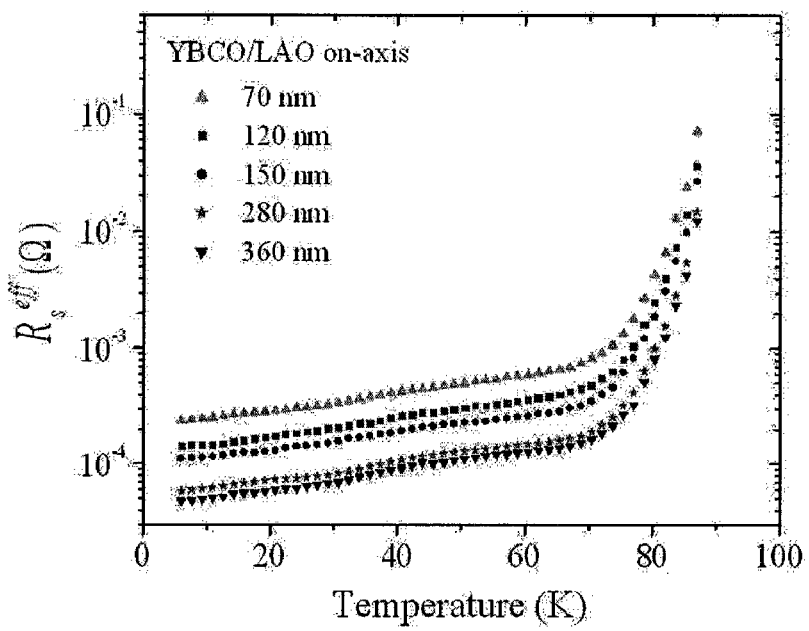
FIG. 4a is a graph showing the temperature dependence of the effective surface resistance $R_S^{eff}$ for YBCO thin films having different thicknesses, measured at a frequency of 8.5 GHz, according to an embodiment of the present invention.
Figure 4B:
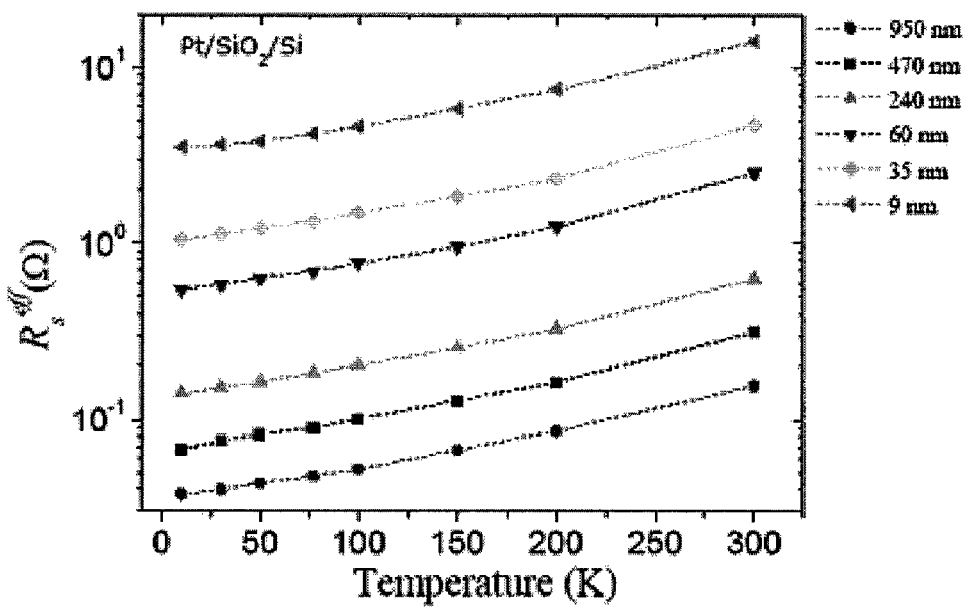
FIG. 4b is a graph showing the temperature dependence of the effective surface resistance $R_S^{eff}$ for Pt thin films having different thicknesses, measured at frequencies ranging from 8.5 GHz to 9.7 GHz using a 9.7 GHz rutile resonator, according to an embodiment of the present invention.
Figure 4C:
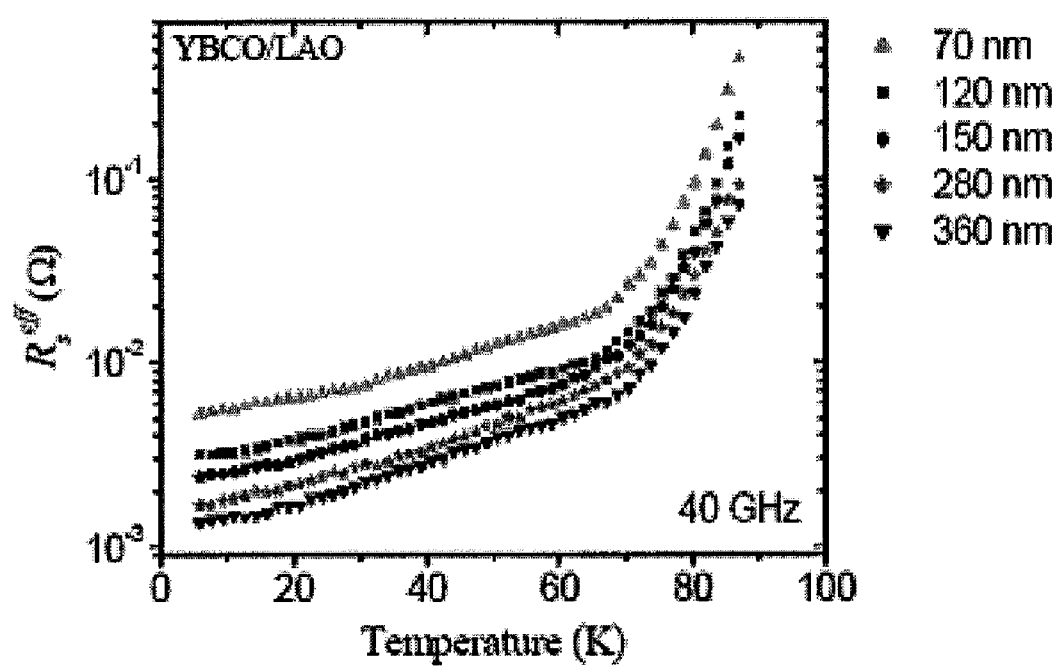
FIG. 4c is a graph showing the thickness dependence of the effective surface resistance $R_S^{eff}$ of YBCO thin films having different thicknesses, measured at a frequency of 40 GHz using a sapphire resonator, according to an embodiment of the present invention.
Figure 5A:
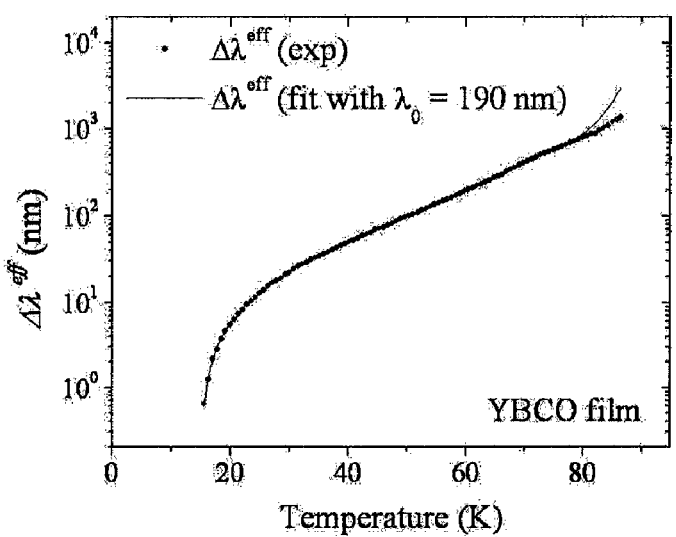
FIG. 5a is a graph showing the comparison of the temperature dependence of the effective penetration depth $\Delta\lambda^{eff}$, obtained from the temperature dependence of the resonant frequency of a 19.5 GHz $TE_{011}$ mode sapphire resonator, in which YBCO thin films are installed, with fitting results thereof, obtained after the temperature dependence has been obtained, according to an embodiment of the present invention.
Figure 5B:
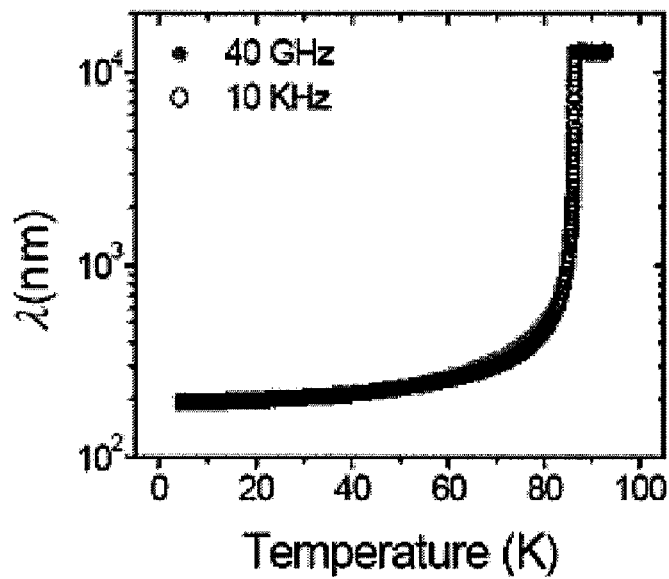
FIG. 5b is a graph showing the comparison of the temperature dependence of the intrinsic penetration depth $\lambda$ obtained from the temperature dependence of the resonant frequency for a 40 GHz $TE_{021}$ mode sapphire resonator, in which YBCO thin films are installed, with the absolute value of the intrinsic penetration depth, measured at a frequency of 10 KHz using a mutual inductance method after the temperature dependence has been obtained, according to an embodiment of the present invention.
Figure 6A:
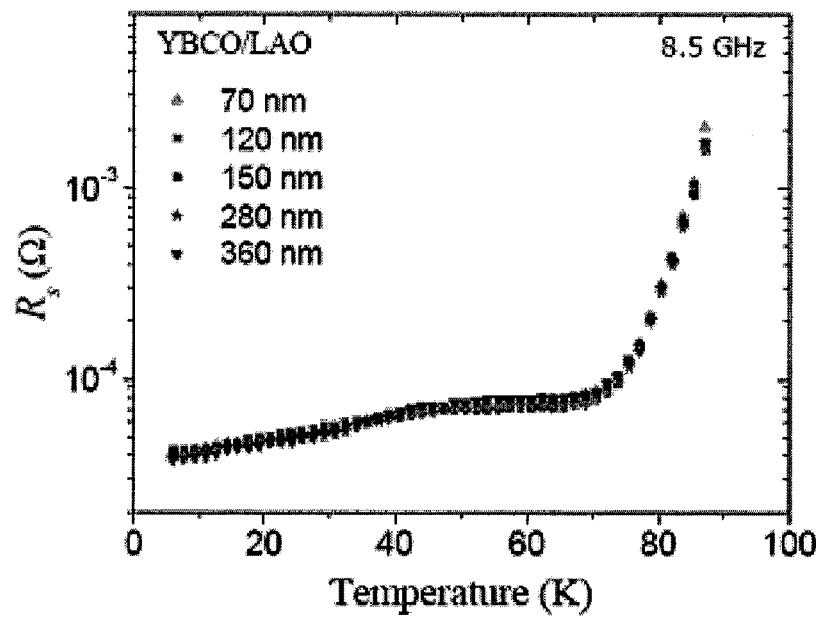
FIG. 6a is a graph showing the temperature dependence of the intrinsic surface resistance $R_S$ for YBCO thin films having different thicknesses, measured at a frequency of 8.5 GHz, according to an embodiment of the present invention.
Figure 6B:
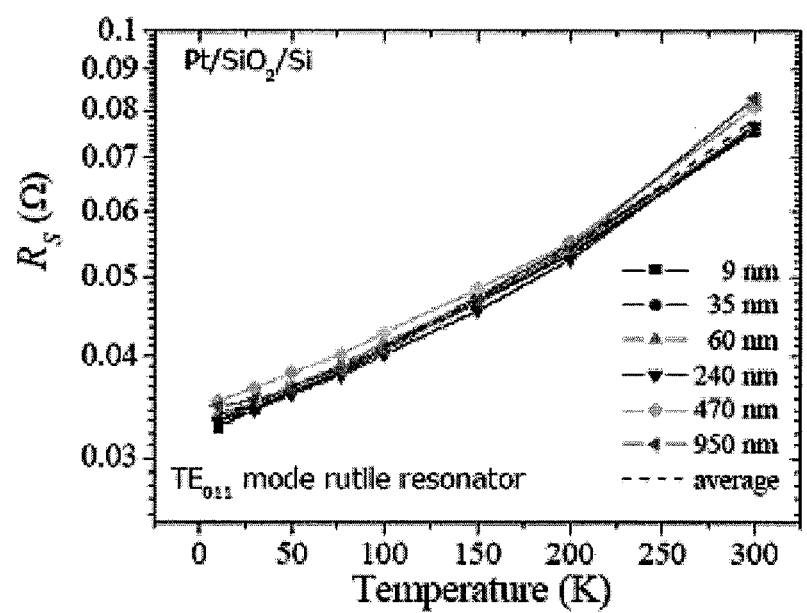
FIG. 6b is a graph showing the temperature dependence of the intrinsic surface resistance $R_S$ for Pt thin films having different thicknesses, measured at frequencies ranging from 8.5 GHz to 9.7 GHz using a rutile resonator according to an embodiment of the present invention (where the dotted line indicates the temperature dependence of the mean value of the intrinsic surface resistances $R_S$ of Pt thin films having different thicknesses, and is a value used as a calibrated $R_S$ when the thicknesses of Pt thin films are measured using a rutile resonator)
Figure 6C:
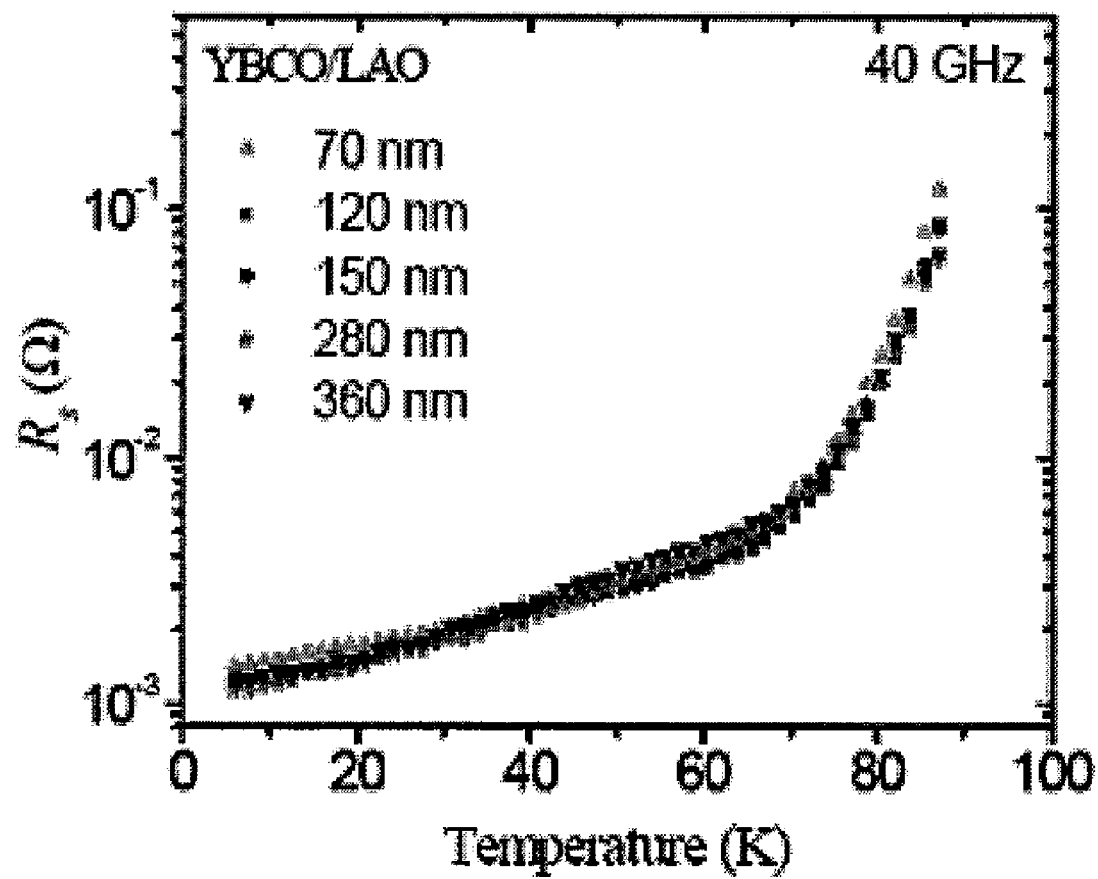
FIG. 6c is a graph showing the temperature dependence of the intrinsic surface resistance $R_S$ for YBCO thin films having different thicknesses, measured at a frequency of 40 GHz, according to an embodiment of the present invention.
Figure 7A:
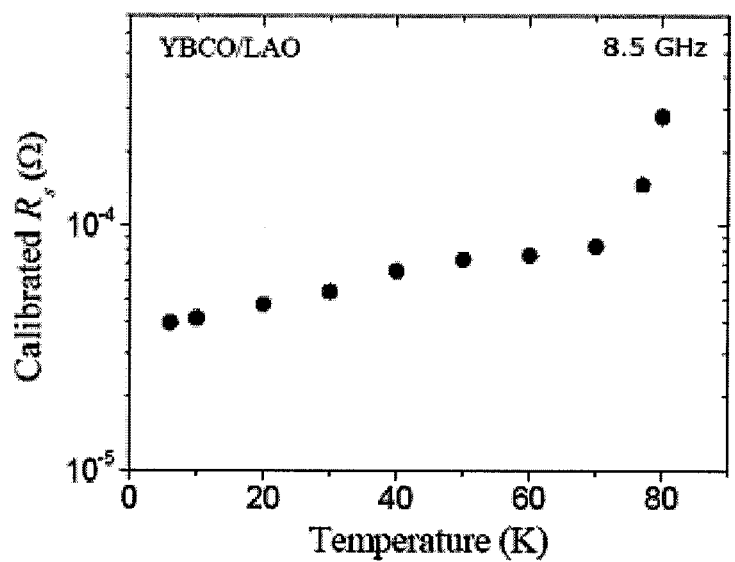
FIG. 7a is a graph showing the temperature dependence of the mean value of the intrinsic surface resistances $R_S$ for YBCO superconductor thin films having different thicknesses, measured at a frequency of 8.5 GHz, according to an embodiment of the present invention.
Figure 7B:
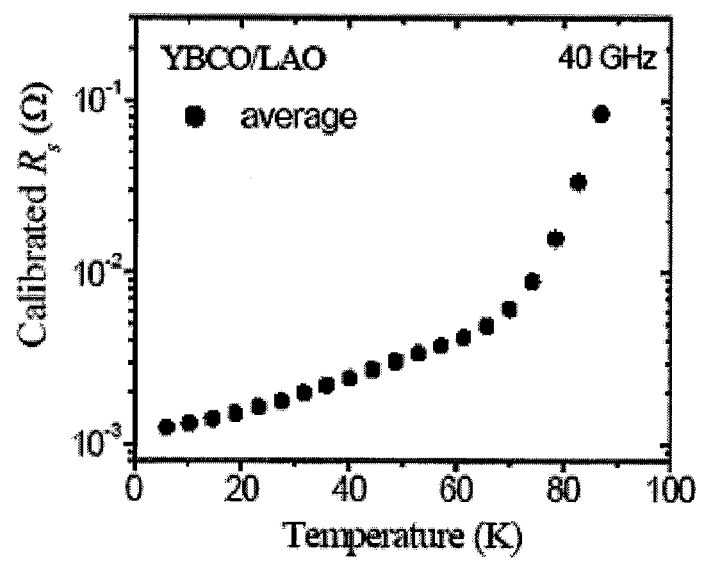
FIG. 7b is a graph showing the temperature dependence of the mean value of the intrinsic surface resistances $R_S$ for YBCO superconductor thin films having different thicknesses, measured at a frequency of 40 GHz, according to an embodiment of the present invention (where $R_S$ is a calibrated $R_S$ required to measure the thicknesses of YBCO thin films at 40 GHZ)
Figure 8A:
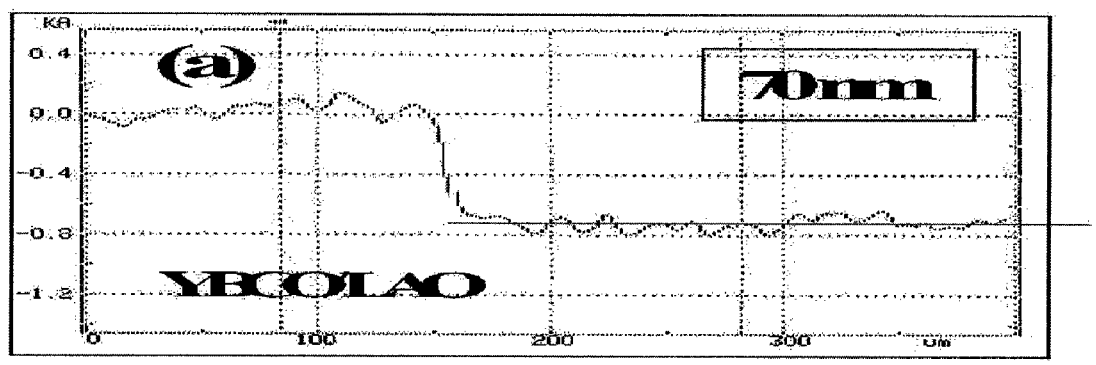
FIGS. 8a to 8e are graphs showing the results obtained by measuring the thicknesses of YBCO superconductor thin films using an α-step profilometer according to an embodiment of the present invention.
Figure 8B:
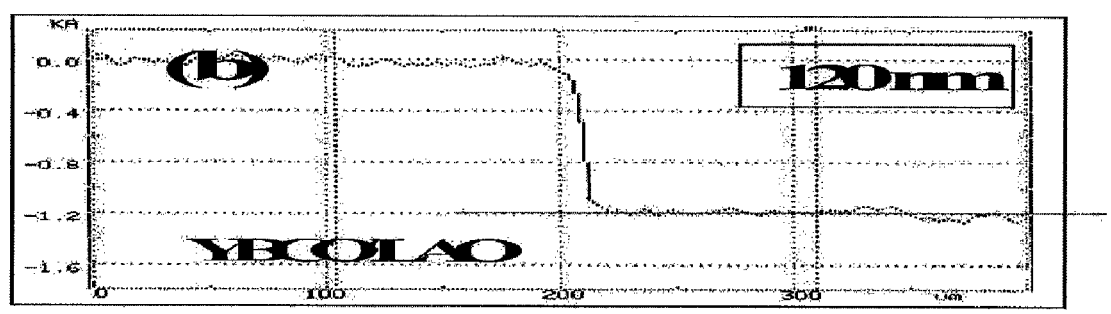
Figure 8C:
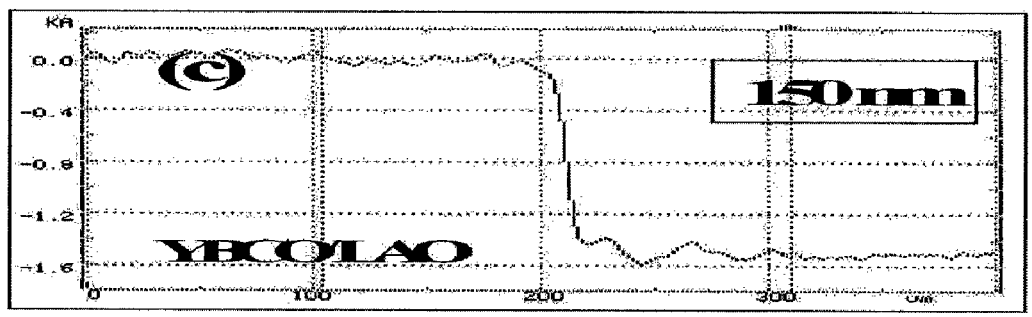
Figure 8D:
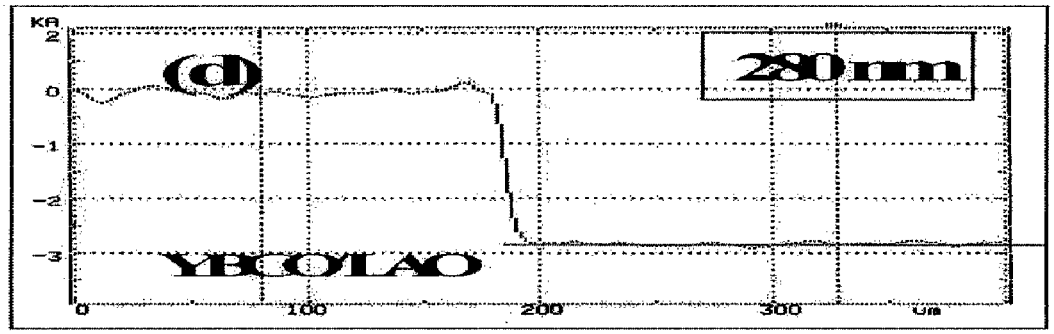
Figure 8E:
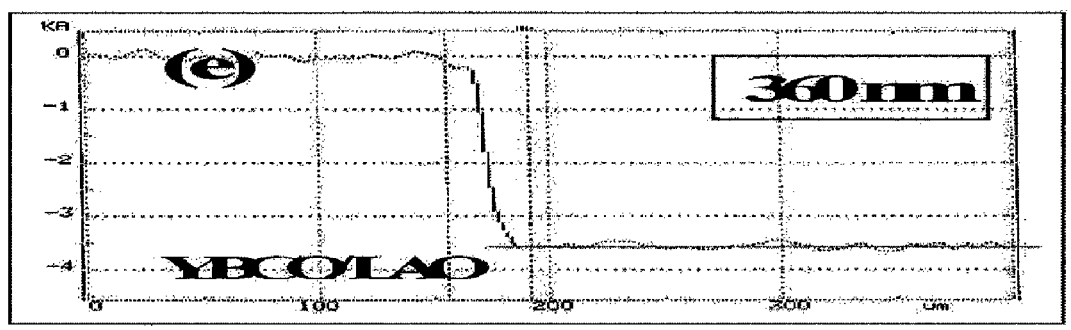
Figure 9A:
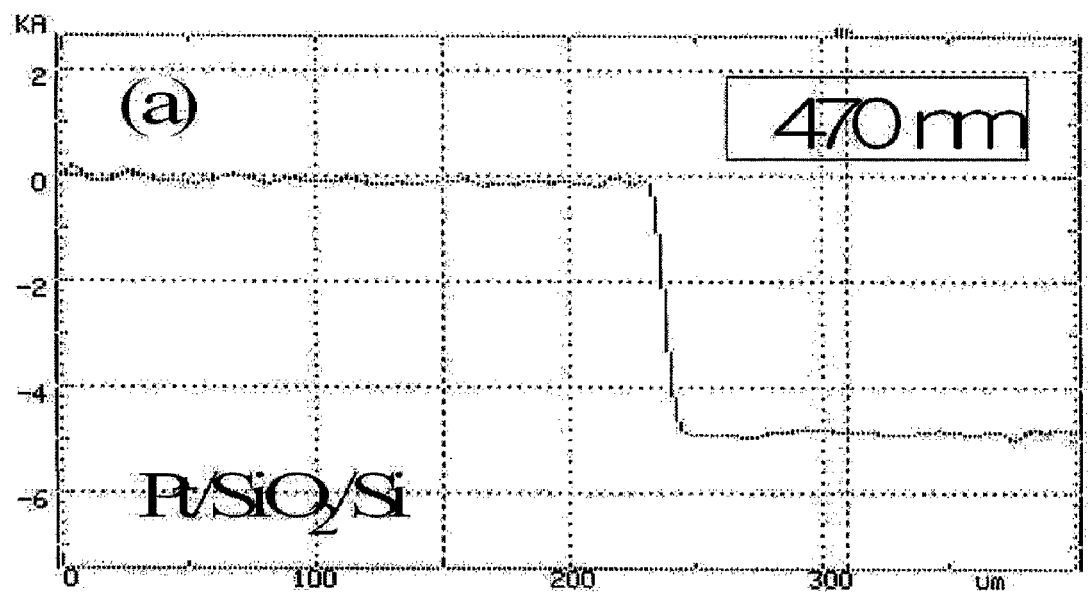
FIGS. 9a and 9b are graphs showing the results obtained by measuring the thicknesses of Pt thin films using an α-step profilometer according to an embodiment of the present invention.
Figure 9B:
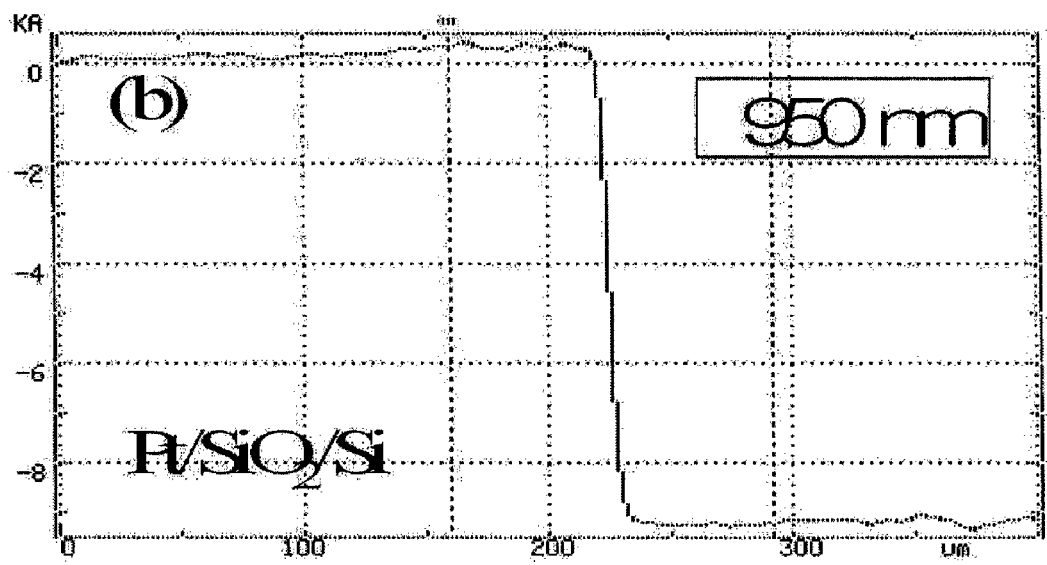
Figure 10A:
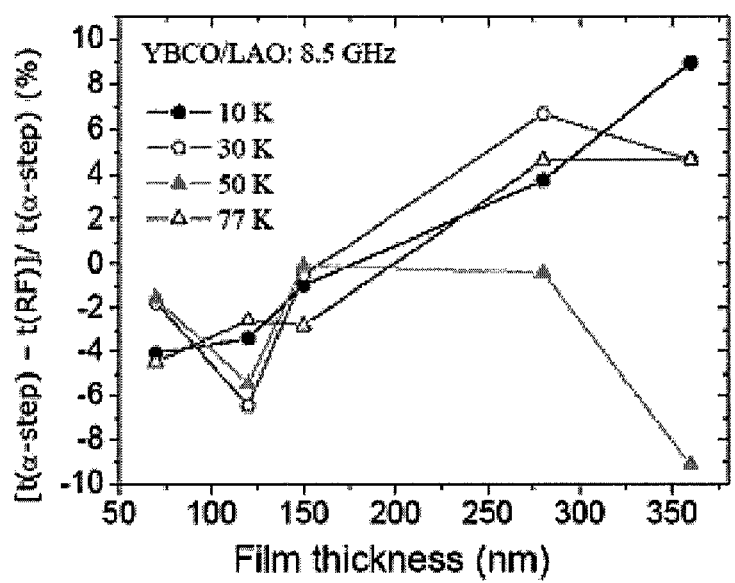
FIG. 10a is a graph showing the comparison of the thickness of a YBCO superconductor thin film measured at a microwave frequency of 8.5 GHz and at temperatures of 10 K, 30 K, 50 K and 77 K, with the thickness measured using an α-step profilometer according to an embodiment of the present invention (where t(RF) is the thickness of a YBCO superconductor thin film measured in a microwave frequency band)
Figure 10B:
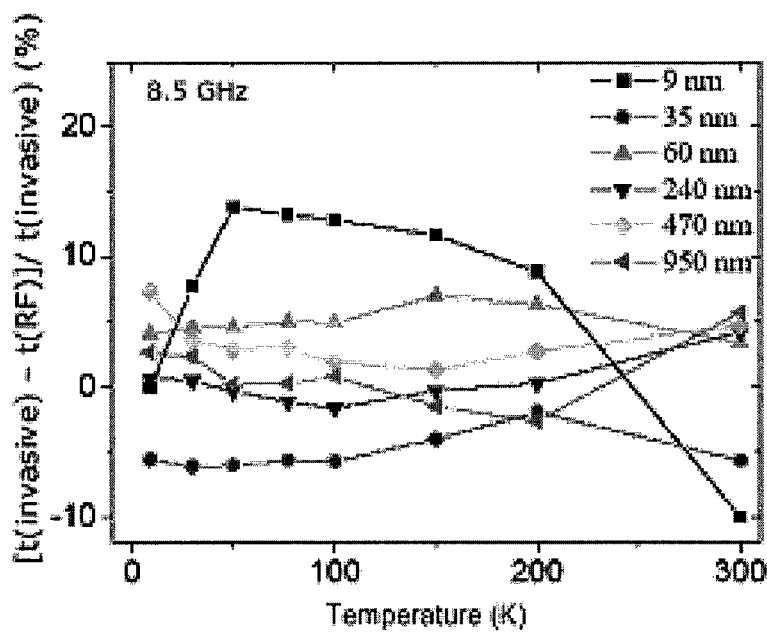
FIG. 10b is a graph showing the comparison of the thickness of a Pt conductor thin film measured at a microwave frequency of 9.7 GHz with the thicknesses measured using an α-step profilometer and Transmission Electron Microscopy (TEM) according to an embodiment of the present invention (where t (RF) is the thickness of a YBCO superconductor thin film measured in a microwave frequency band, and t(invasive) is the thickness measured using an invasive method, such as with an α-step profilometer or TEM)
Figure 10C:
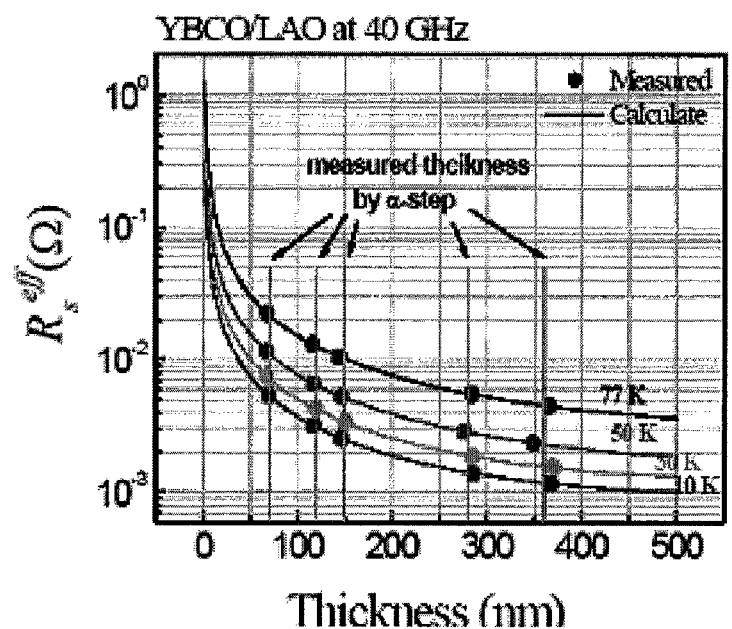
FIG. 10c is a graph showing the thickness of a YBCO superconductor thin film measured at a microwave frequency of 40 GHz and at temperatures of 10 K, 30 K, 50 K and 77 K, based on $R_S^{eff}$ of the YBCO superconductor thin film, according to an embodiment of the present invention.
Figure 10D:
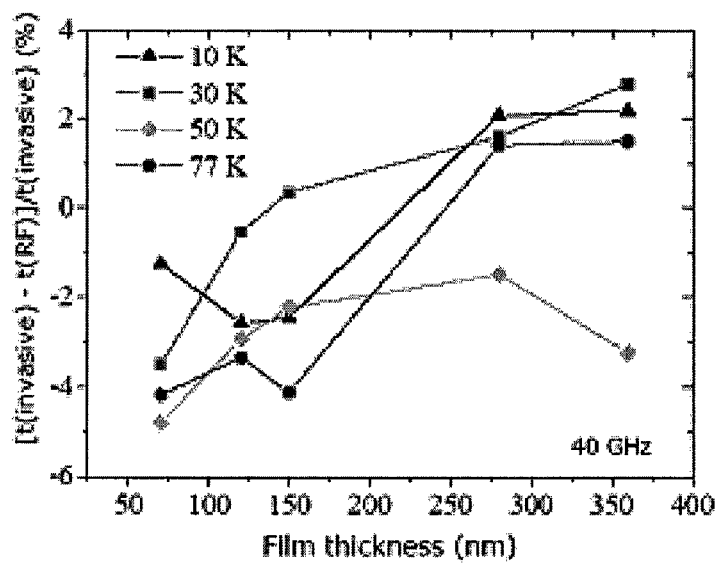
FIG. 10d is a graph showing the comparison of the thickness of a YBCO superconductor thin film measured at a microwave frequency of 40 GHz and at temperatures of 10 K, 30 K, 50 K and 77 K, with the thicknesses measured using an α-step profilometer and TEM according to an embodiment of the present invention (where t(RF) is the thickness of a YBCO superconductor thin film measured in a microwave frequency band, and t(invasive) is the thickness measured using an invasive method, such as with an α-step profilometer or TEM)
Figure 10E:
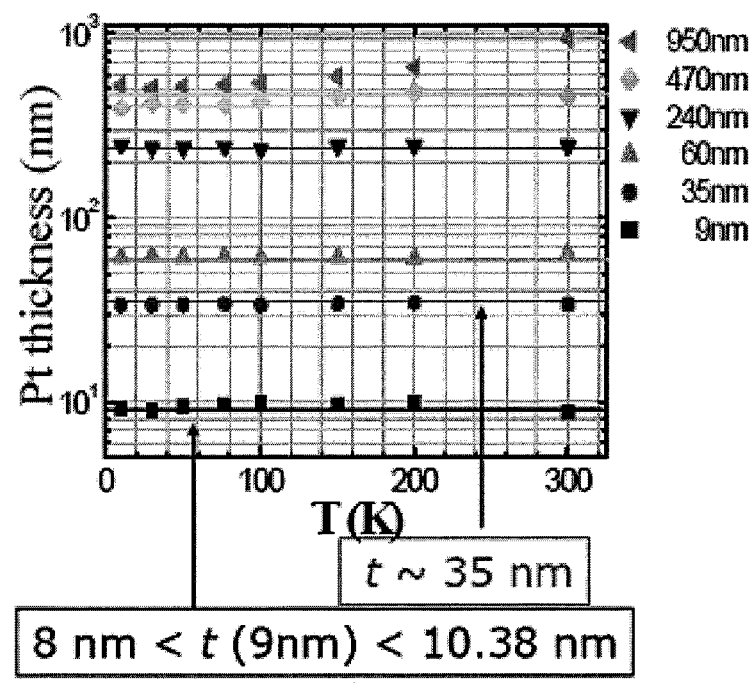
FIG. 10e is a graph showing the thickness of a Pt thin film measured at a microwave frequency of 40 GHz in a temperature range from 10K to 300 K while changing the temperature, according to an embodiment of the present invention.
Figure 10F:
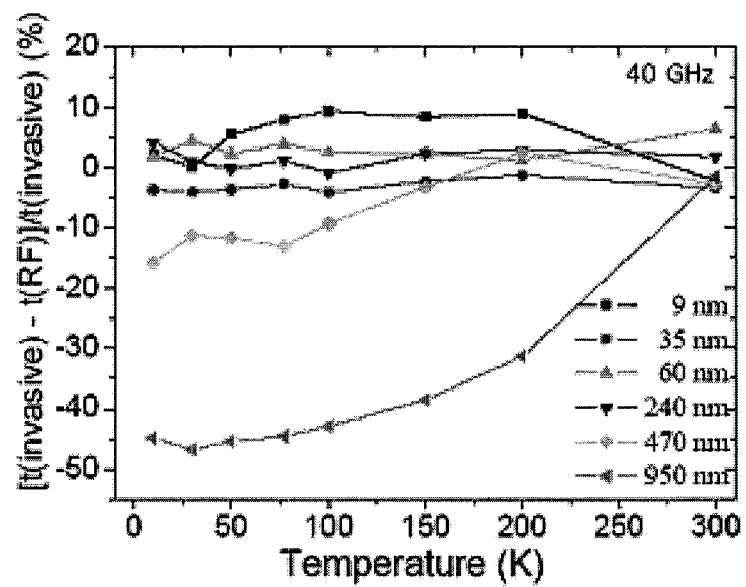
FIG. 10f is a graph showing the comparison of the thickness of a Pt thin film measured at a microwave frequency of 40 GHz in a temperature range from 10K to 300 K while changing the temperature, with the thicknesses measured using an α-step profilometer and TEM according to an embodiment of the present invention (where t(RF) is the thickness of a YBCO superconductor thin film measured in a microwave frequency band, and t(invasive) is the thickness measured using an invasive method, such as with an α-step profilometer or TEM)
Figure 11A:
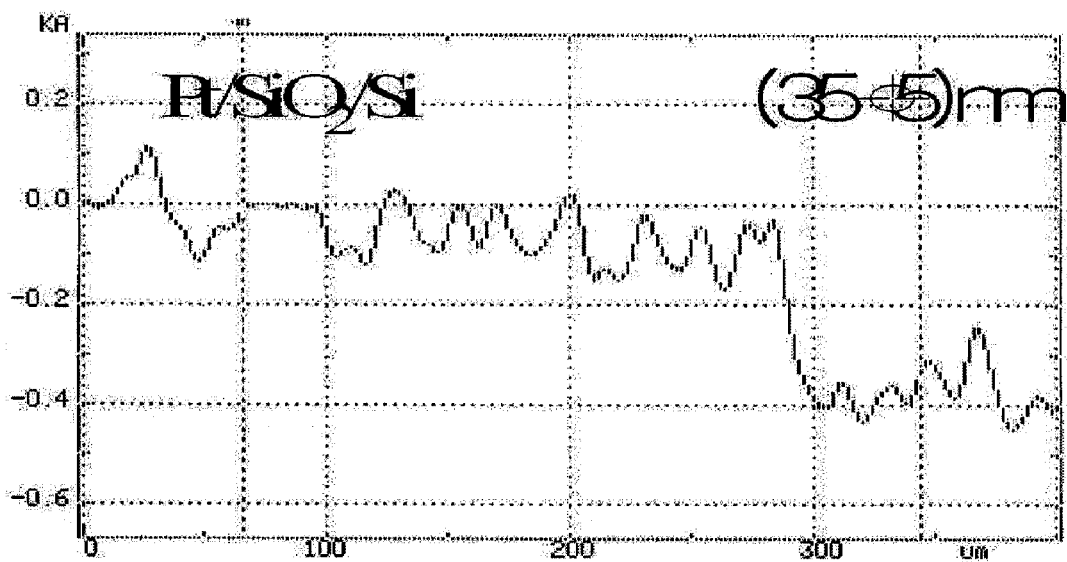
FIG. 11a is a graph showing the results obtained by measuring the thickness of a Pt thin film, having a thickness of 35∓5 nm, using an α-step profilometer, according to an embodiment of the present invention.
Figure 11B:
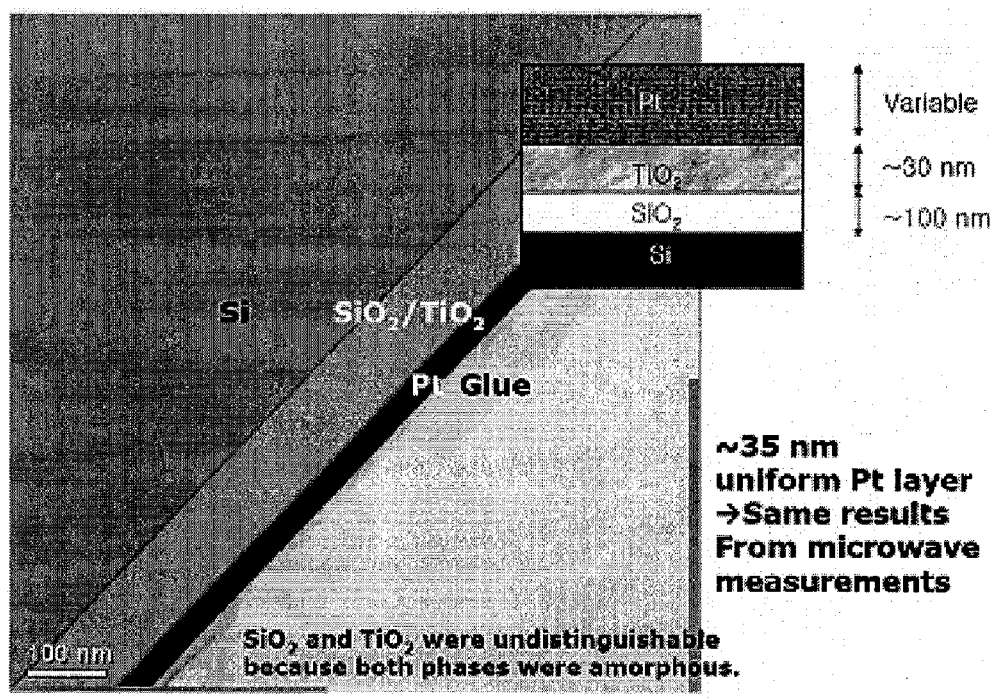
FIG. 11b is a graph showing the results obtained by measuring the thickness of a Pt thin film, having a thickness of 35∓5 nm, using TEM, according to an embodiment of the present invention.
Figure 11C:
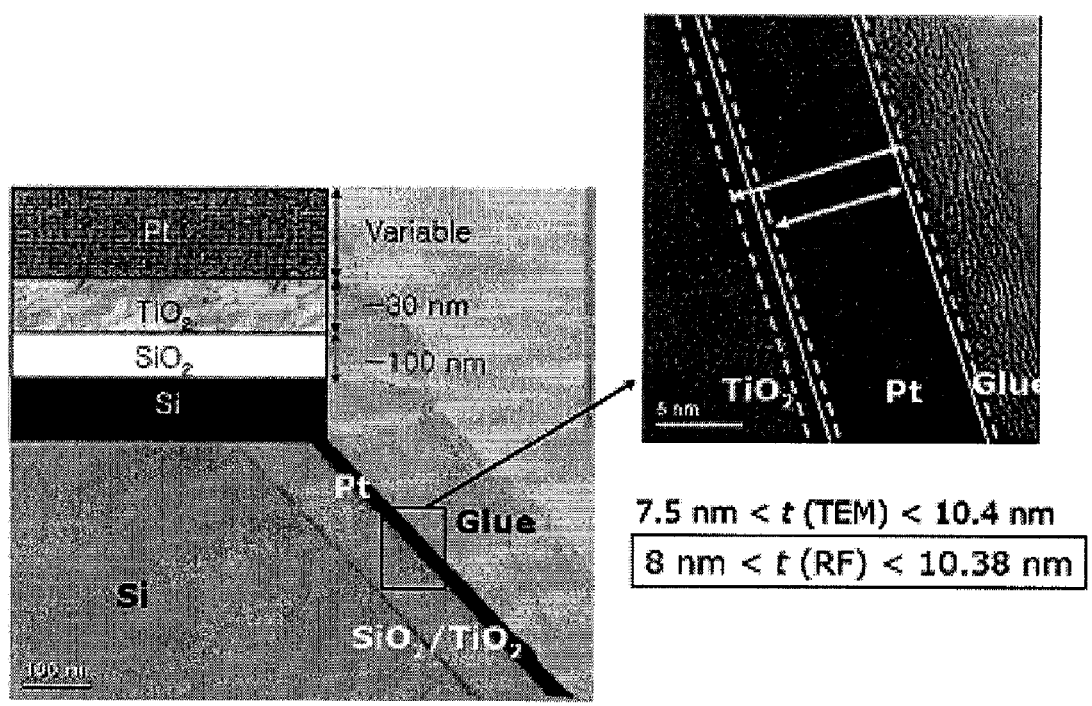
FIG. 11c is a graph showing the results obtained by measuring the thickness of a Pt thin film, having a thickness of 9∓1 nm, using TEM according to an embodiment of the present invention.

FIGS. 3a and 3b are graphs showing the temperature dependence of $TE_{011}$ mode unloaded $Q(Q_0)$ measured for rutile resonators, in which YBCO superconductor thin films and Pt thin films, having different thicknesses, are installed, respectively, and the Pt thin film thickness dependence of $TE_{011}$ mode unloaded $Q(Q_0)$ measured for the rutile resonators at a normal room temperature according to an embodiment of the present invention. FIGS. 4a and 4b are graphs showing the temperature dependence of the effective surface resistances $R_S^{eff}$ for YBCO high temperature superconductor thin films having different thicknesses, measured at a frequency of about 8.5 GHz (in the case of Pt thin films, 8.5 GHz to 9.7 GHz) using a rutile resonator, and the thickness dependence of $R_S^{eff}$ of Pt thin films measured at a frequency of 9.7 GHz and at a normal room temperature using the same rutile resonator according to an embodiment of the present invention. FIG. 4c is a graph showing the temperature dependence of the effective surface resistances $R_S^{eff}$ for YBCO superconductor thin films having different thicknesses measured at a frequency of 40 GHz using a sapphire resonator. FIG. 5a is a graph showing the comparison of the temperature dependence of the change in the effective penetration depth $\Delta\lambda^{eff}$ for YBCO thin films, obtained from the temperature dependence of the resonant frequency of a 19.5 GHz $TE_{011}$ mode sapphire resonator, in which YBCO thin films are installed, with fitting results thereof obtained after the temperature dependence has been measured according to an embodiment of the present invention (this graph shows that optimal fitting results are obtained when the intrinsic penetration depth at a temperature of 0 K ($\lambda_0$) is set to 190 nm). FIG. 5b is a graph showing the comparison of the intrinsic penetration depth for YBCO thin films, obtained from the temperature dependence of the resonant frequency of the 40 GHz $TE_{021}$ mode sapphire resonator, with results obtained using a mutual inductance method at a frequency of 10 KHz. FIG. 6a is a graph showing the temperature dependence of the intrinsic surface resistances $R_S$ for YBCO superconductor thin films, having thicknesses of 70 nm to 360 nm, which is obtained by performing calculations on the effective surface resistance $R_S^{eff}$ measured at a frequency of 8.5 GHz and the penetration depth $\lambda$ of the YBCO superconductor thin films, according to an embodiment of the present invention. FIG. 6b is a graph showing the thickness and temperature dependence of $R_S$ for Pt thin films obtained by performing calculations at frequencies ranging from 8.5 GHz to 9.7 GHz in consideration of the fact that, in the case of the Pt thin films, the effective surface resistance $R_S^{eff}$ and effective surface reactance $X_S^{eff}$ are equal to each other, and the temperature dependence of the mean value of $R_S$ for the Pt thin films having different thicknesses according to an embodiment of the present invention. FIG. 6c is a graph showing the effective surface resistance $R_S^{eff}$ and electromagnetic wave penetration depth $\lambda$ of a YBCO superconductor thin film, which are measured at a frequency of 40 GHz, and the temperature dependence of the intrinsic surface resistances $R_S$ for YBCO thin films having thicknesses of 70 nm to 360 nm, which are obtained by performing calculations on the effective surface resistance and the penetration depth according to an embodiment the present invention. FIGS. 7a and 7b are graphs showing the temperature dependence of the mean value of the intrinsic surface resistances $R_S$ for YBCO high temperature superconductor thin films having different thicknesses, measured at frequencies of 8.5 GHz and 40 GHz, respectively, according to an embodiment of the present invention. FIGS. 8a to 8e are graphs showing the thicknesses of YBCO superconductor thin films measured using an α-step profilometer for respective thicknesses according to an embodiment of the present invention. FIGS. 9a and 9b are graphs showing the thicknesses of Pt thin films having thicknesses of about 470 nm and 950 nm, respectively, measured using an α-step profilometer according to an embodiment of the present invention. FIGS. 10a and 10b are graphs showing the comparison of the thicknesses of YBCO superconductor thin films measured at a microwave frequency of 8.5 GHz and the thicknesses of Pt conductor thin films measured in a microwave frequency region ranging from 8.5 to 9.7 GHz using a rutile resonator, with the thicknesses measured using an α-step profilometer (Pt thin films having thicknesses of 60 nm to 950 nm) and TEM (Pt thin films having thicknesses of 9 nm to 35 nm) according to an embodiment of the present invention. FIGS. 10c and 10d are graphs showing the thicknesses of YBCO superconductor thin films having thicknesses of 70 nm to 360 nm, measured at a microwave frequency of 40 GHz at four different temperatures of 10 K, 30 K, 50 K, and 77 K using a sapphire resonator, and the comparison of the thicknesses of the YBCO superconductor thin films measured at respective temperatures with the values obtained by using an α-step profilometer, according to an embodiment of the present invention. FIGS. 10e and 10f are graphs showing the thicknesses of Pt conductor thin films having thicknesses from 9 nm to 950 nm, measured at a microwave frequency of 40 GHz in a temperature range from 10K to 300K using a sapphire resonator, and the comparison of the thicknesses of the Pt thin films measured at respective temperatures with the values obtained by using an α-step profilometer (Pt thin films having thicknesses from 60 nm to 950 nm) and TEM (Pt thin films having thicknesses of 9 nm and 35 nm) according to an embodiment of the present invention. FIG. 11a is a graph showing the results obtained by measuring the thicknesses of Pt thin films having a thickness of 35∓5 nm, using an α-step profilometer, according to an embodiment of the present invention, and FIGS. 11b and 11c are graphs showing the results obtained by measuring the thickness of a Pt conductor thin film having a thickness of about 35 nm and a Pt conductor thin film having a thickness of about 9 nm, using TEM, according to an embodiment of the present invention.

For reference, when the intrinsic surface resistance of a YBCO superconductor thin film is measured by using a 8.5 GHz rutile resonator, the penetration depth of the YBCO superconductor thin film measured with a 19.5 GHz sapphire resonator is used in consideration of the fact that the penetration depth is frequency-independent.

The measurement of the thickness of a superconductor thin film according to an embodiment of the present invention is performed by performing the steps of i) measuring the Q-factor of a rutile resonator or a sapphire resonator, in which a YBCO superconductor thin film for calibration is installed, in a calibration process, ii) obtaining the effective surface resistance of the superconductor thin films at the resonant frequencies of respective resonators using the measured Q-factor, iii) measuring the penetration depth of the superconductor thin films, iv) calculating the intrinsic surface resistances of the superconductor thin films at respective resonant frequencies using both the effective surface resistances of the superconductor thin films, measured at the resonant frequencies of respective resonators, and the measured penetration depths, v) obtaining the effective surface resistances of a YBCO thin film, the thickness of which is to be measured, at respective resonant frequencies using a rutile resonator or sapphire resonator, in which the YBCO thin film for measurement is installed, through the above i) and ii) steps, and vi) obtaining the thickness of the YBCO thin film for measurement, using the relational expression between the effective surface resistances and the intrinsic surface resistances of the YBCO thin film at respective resonant frequencies, which is given as a function of thickness. Hereinafter, the above steps are described in detail.

First Step: Measurement of the Q-Factor of a Dielectric Resonator

The measurement of the Q-factor of a sapphire resonator according to an embodiment of the present invention is performed through the following process. First, $S_{21}$ values of the sapphire resonator are obtained from a separate vector network analyzer. Such a value $S_{21}$ is one component of a scattering matrix [S] defined in a 2-port network separately having a signal input port port1 and a signal output port port2, and is the value defined by the ratio of the potential level $V_2^-$ of the signal output from the output port port2 to the potential level $V_1^+$ of the signal input to the input port port1 when the potential level $V_2^+$ of the signal reflected from the output port port2 is 0, that is, $S_{21}=V_2^-/V_1^+$.

The loaded Q of the resonator (hereinafter referred to as '$Q_L$') is obtained from the above $S_{21}$ values through the fitting of the following Equation 1.

$$|S_{21}(f)|=|S_{21}(f_0)|/(1+Q_L^2\Delta^2(f))^{1/2}$$ [Equation 1]

In this case, f and $f_0$ denote measured frequency and resonant frequency, respectively, and $Q_L$ denotes loaded Q. When the input coupling and the output coupling of the resonator are symmetrically implemented, that is, symmetrical coupling is implemented, $Q_L$ can be obtained using equation $Q_L=f_0/\Delta f_{3dB}$. In this case, $\Delta f_{3dB}$ is the interval between frequencies at which output power is ½ of the power of the output signal at the resonant frequency $f_0$.

The $Q_L$ is used to obtain unloaded Q (hereinafter referred to as '$Q_0$', indicating the inherent characteristics of the resonator. When weak coupling between the input/output lines and the dielectric resonator is maintained, $Q_0 \approx Q_L$ is satisfied, and, in general, $Q_0$ is represented by $Q_0 \approx Q_L/\{1-10^{-IL(dB)/20}\}$. In this case, 'IL' denotes insertion loss and has a relationship of $IL(dB)=-10\log_{10}|S_{21}|$ with respect to a scattering parameter $S_{21}$. When symmetric coupling is not realized between the input/output lines and the resonator, or when IL has a value less than 30 dB, $Q_L$ and $Q_0$ of the dielectric resonator can be obtained through S-parameter circle-fitting.

FIGS. 3a and 3b illustrate the results of the measurement of the temperature dependence of the $TE_{011}$ mode $Q_0$ of the rutile resonator, in which YBCO superconductor thin films are installed, and the results of the measurement of the thickness dependence of the $TE_{011}$ mode $Q_0$ of the rutile resonator, in which Pt conductor thin films are installed, at a normal room temperature, according to an embodiment of the present invention.

Second Step: Determination of the Effective Surface Resistance of Superconductor Thin Films for Calibration Generally, $Q_0$ of a dielectric resonator is represented by $1/Q_0=P_c/\omega_0 W+P_d/(\omega_0 W)$ when the resonator is sealed and no energy loss is caused by the radiation of electromagnetic waves. In this case, W denotes the average electromagnetic field energy stored in the resonator, $P_c$ and $P_d$ denote the average power losses caused by a conductive surface and a dielectric rod provided in the resonator, respectively, and $\omega_0$ is an angular resonant frequency ($=2\pi f_0$). Meanwhile, since $P_c$ is the sum of the power losses caused by the superconductor thin films, placed on the bottom surface and the top surface of the resonator, and caused by the conductive surface constituting the side of a cylindrical shape, $P_c$ is represented by $P_c=P_c^b+P_c^t+P_c^s$. Since $P_c^b \propto R_s^b$, $P_c^t \propto R_s^t$, and $P_c^s \propto R_s^s$ are satisfied, $P_c/(\omega_0 W)$ is represented by $P_c/(\omega_0 W)=R_s^b/\Gamma_{bottom}+R_s^t/\Gamma_{top}+R_s^s/\Gamma_{side}$, where $R_s^b$ denotes the surface resistance of the superconductor thin film used as the bottom plate of the resonator, $R_s^t$ denotes the surface resistance of the superconductor thin film used as the top plate of the resonator, and $R_s^s$ denotes the surface resistance of the conductor constituting the side of the resonator. When the thickness of each superconductor thin film is not sufficiently greater than the penetration depth, $R_s^b$ and $R_s^t$ may designate the effective surface resistances of the superconductor thin films, respectively, that is, $R_s^{eff,b}$ and $R_s^{eff,t}$, due to the effect of the finite thicknesses of the thin films. Further, since the magnitudes of $\Gamma_{Bottom}$, $\Gamma_{top}$ and $\Gamma_{side}$ are determined by the distribution of the electromagnetic field in the resonator and the geometrical structure of the surfaces of the superconductor thin films and the conductive surface, they are designated as geometrical factors. The unit thereof is $\Omega$ which is equal to that of surface resistance. Meanwhile, $P_d/(\omega_0 W)$ can be represented by $P_d/(\omega_0 W)=k\cdot\tan\delta$, where $\tan\delta$ denotes the ratio of the imaginary number part to the real number part of the permittivity $\in$ ($\in=\in'+i\in''$) of the dielectric rod that is placed in the resonator, that is, $\tan\delta=\in''/\in'$, and k denotes the ratio of the electromagnetic field energy stored in the dielectric rod to the overall energy stored in the resonator, and is called a filling factor.

The relationship between the $Q_0$ of the TEAS mode dielectric resonator at the resonant frequency, which is measured at the first step, the $R_S$ of the conductor surrounding the dielectric resonator, and the loss tangent $\tan\delta$ of the dielectric rod installed in the resonator is given by the following Equation 2.

$$\frac{1}{Q_{op}} = A_p R_{Sp}^{eff,b} + B_p R_{Sp}^{eff,t} + C_p R_{Sp}^{Cu,s} + k_p \tan\delta_p$$ [Equation 2]

In this case, $R_{Sp}^{eff,t}$ denotes the effective surface resistance of the top superconductor (or conductor) thin film, $R_{Sp}^{eff,b}$ denotes the effective surface resistance of the bottom superconductor (or conductor) thin film used as the bottom plate, and $R_{Sp}^{Cu,s}$ denotes the surface resistance of the side conductor (in this case, oxygen-free high-purity copper is used), $k_p$ denotes a filling factor, $\tan\delta_p$ denotes the loss tangent of the dielectric, $A_p=1/\Gamma_{Bottom}$, $B_p=1/\Gamma_{Top}$, $C_p=1/\Gamma_{Side}$, and p indicates that a resonance mode is a p-mode. Generally, the effective surface resistance of a conductor thin film or a superconductor thin film is greater than the intrinsic surface resistance thereof, but, if the effective surface resistance is sufficiently greater than the penetration depth of each material at the measurement frequency and temperature (typically, this case corresponds to the case where the effective surface resistance is more than three times the penetration depth), the effective surface resistance is almost the same as the intrinsic surface resistance.

Therefore, if the effective surface resistances of the top and bottom superconductor thin films or conductor thin films of the resonator according to the embodiment of the present invention are equal to each other ($R_{Sp}^{eff,b}=R_{Sp}^{eff,t}$) the temperature dependence of the effective surface resistance $R_{Sp}^{eff,t}$ for the superconductor thin film or the conductor thin film can be obtained from the temperature dependence of $Q_{0p}$, as shown in FIGS. 3a and 3b.

In Equation 2, in order to obtain the effective surface resistance $R_{Sp}^{eff,t}$ of the superconductor thin film or the conductor thin film, $\tan\delta_p$ of the dielectric and the surface resistance $R_{Sp}^{Cu,s}$ of the side conductor, made of copper, must be separately measured. These values can be obtained by measuring $Q_0$ and resonant frequency in each mode after a resonator is designed so that resonant signals in $TE_{012}$ mode and $TE_{021}$ mode can be observed at nearby frequencies, as shown in FIG. 2b. A detailed process thereof is described below.

If the resonant frequencies of the $TE_{012}$ mode and the $TE_{021}$ mode are denoted by $f_{01}$ and $f_{02}$, respectively, the frequency dependences of $\tan\delta$, $R_{Sp}^{eff,t}$ and $R_{Sp}^{eff,b}$ measured at an arbitrary frequency f can be represented by the following Equation.

$$\frac{\tan\delta}{f} = \frac{\tan\delta_p}{f_{op}},$$

$$R_{Sp}^{eff,b} = \left(\frac{f_{op}}{f}\right)\alpha R_S^{eff,b},$$

$$R_{Sp}^{eff,t} = \left(\frac{f_{op}}{f}\right)\alpha R_S^{eff,t}$$

[Equation 3]

In the case of a superconductor thin film, $\alpha=2$, and, in the case of a conductor thin film, $\alpha=1/2$. For reference, in the case of a superconductor thin film, $R_s^{eff} \propto f^2$ is derived from the relational expression $R_s \propto f^2$, which is predicted from a two-fluid model for a superconductor (this applies to the case where the measurement temperature is not very close to a threshold temperature). $\tan \delta \propto f$ is an approximate relational expression for the frequency dependence of $\tan \delta$ for a low loss dielectric, such as sapphire or rutile. Through the above Equations 2 and 3, $\tan \delta_1$ and $R_{S1}^{eff,t}$ at a frequency of $f_{01}$ can be arranged as in the following Equation 4.

$$\tan \delta_1 = \frac{X_2(A_1 + B_1) - X_1(A_2' + B_2')}{k_2'(A_1 + B_1) - k_1(A_2' + B_2')} \quad \text{[Equation 4]}$$

$$R_{S1}^{eff,t} = \frac{k_2' X_1 - k_1 X_2}{k_2'(A_1 + B_1) - k_1(A_2' + B_2')}$$

$$X_1 = \left[\left(\frac{1}{Q_{01}}\right) - (C_1 R_{S1}^{Cu})\right]$$

$$X_2 = \left[\left(\frac{1}{Q_{02}}\right) - (C_2 R_{S2}^{Cu})\right]$$

In Equation 4, $R_{S1}^{Cu}$ and $R_{S2}^{Cu}$ can be obtained using a procedure for changing Equation 2 for the $Q_0$ of the dielectric resonator into the following Equation 5 when copper plates having the same characteristics as the side conductor are installed on the top and bottom surfaces of a $TE_{0mn}$ mode dielectric resonator.

$$\frac{1}{Q_{op}(Cu)} = A_p R_{Sp}^{Cu,b} + B_p R_{Sp}^{Cu,t} + C_p R_{Sp}^{Cu,s} + k_p \tan \delta_p \quad \text{[Equation 5]}$$

$$= R_{Sp}^{Cu}(A_p + B_p + C_p) + k_p \tan \delta_p$$

In Equation 5, $Q_{op}(CU)$ denotes $Q_0$ of the dielectric resonator, measured when the side of the dielectric resonator is made of copper and when copper plates, having the same characteristics as said copper, are used as the top plate and the bottom plate of the resonator.

FIGS. 4a and 4b illustrate the results obtained by measuring the thickness dependence of the effective surface resistances of YBCO superconductor thin films having thicknesses from 70 nm to 360 nm and Pt thin films having thicknesses from 9 nm to 950 nm at a frequency of 8.5 GHz (in the case of the Pt thin film, 8.5 GHz to 9.7 GHz) using the measurement results of FIGS. 3a and 3b. FIG. 4c is a graph showing the temperature dependence of the effective surface resistances for YBCO superconductor thin films having thicknesses from 70 nm to 360 nm at a frequency of 40 GHz, and shows that the effective surface resistances greatly vary according to the thickness even for thin films made of the same material.

Third Step: Measurement of the Penetration Depth for Superconductor Thin Films for Calibration If a very small gap (10 μm) is formed between the top plate of the dielectric resonator and the remaining portion of the resonator according to an embodiment of the present invention, as shown in FIG. 1b, radiation loss through the gap greatly decreases. The Q of the resonator has a value slightly less than that of the resonator having no gap, whereas variation in resonant frequency with temperature is almost the same as that of the resonator having no gap.

Such a resonator having a gap according to the embodiment of the present invention allows only the temperature of a superconductor thin film placed on the top surface of the resonator to vary while maintaining the temperatures of the bottom superconductor thin film and the dielectric at constant temperatures, thus the penetration depth for the superconductor thin film can be measured using such temperature variation. Even if the temperature of the dielectric is slightly changed within the range of $\mp 0.5K$ during a procedure of measuring the temperature dependence of the resonant frequency, the temperature dependence of the dielectric constant for the dielectric must be very small in order to prevent such a change from influencing the measurement results. In this case, sapphire, having such characteristics, is used.

Generally, variation in the resonant frequency of the dielectric resonator is described as shown in the following Equation 6.

$$-\frac{1}{f_0}\frac{\partial f_0}{\partial T} = \frac{1}{2\Gamma_{Top}}\frac{\partial X_{S,Top}^{eff}}{\partial T} + \quad \text{[Equation 6]}$$

$$\frac{1}{2\Gamma_{Bottom}}\frac{\partial X_{S,Bottom}^{eff}}{\partial T} + \frac{k}{2\epsilon_r}\frac{\partial \epsilon_r}{\partial T} + g_1(r)\frac{\partial r}{\partial T} + g_2(l)\frac{\partial l}{\partial T}$$

In this case, $X_{S,Top}^{eff}$ and $X_{S,Bottom}^{eff}$ denote the effective surface reactances of the superconductor or conductor thin films placed on the top surface and the bottom surface, respectively, $\Gamma_{Top}$ and $\Gamma_{Bottom}$ denote the geometrical factors of the top surface and the bottom surface, respectively, $\epsilon_r$ and k denote the dielectric constant and filling factor of the dielectric, respectively, r and l denote the radius and height of the dielectric rod placed in the resonator, respectively, and $g_1(r)$ and $g_2(l)$ denote a function of r and a function of l, respectively.

When the temperatures of the dielectric rod and the bottom superconductor thin film are maintained at constant temperatures in Equation 6, $$\frac{\partial X_{S,Bottom}^{eff}}{\partial T} = \frac{\partial \epsilon_r}{\partial T} = \frac{\partial r}{\partial T} = \frac{\partial l}{\partial T} = 0$$

is obtained, so that Equation 6 can be arranged as shown in the following Equation 7.

$$-\frac{1}{f_0}\frac{\partial f_0}{\partial T} = \frac{1}{2\Gamma_{Top}}\frac{\partial X_{S,Top}^{eff}}{\partial T} = \frac{1}{2\Gamma_{Top}}\frac{\partial (\omega_0 \mu_0 \lambda_{eff})}{\partial T} \quad \text{[Equation 7]}$$

$$\Delta \lambda_{eff} = -\frac{\Gamma_{Top}}{\pi \mu_0}\frac{\Delta f_0}{f_0^2(T_0)}$$

In Equation [7], relational expression $X_{S,Top}^{eff} = \omega_0 \mu_0 \lambda_{eff} = 2\pi f_0 \mu_0 \lambda_{eff}$ is used to derive the relationship between $\Delta \lambda_{eff}$ and $\Delta f_0$. In this case, $\Delta \lambda_{eff}$ is the difference between $\lambda_{eff}$ at measurement temperature T and $\lambda_{eff}$ at $T_0$, which is the minimum value of the measurement temperature, and is represented by $\Delta \lambda_{eff} = \lambda_{eff}(T) - \lambda_{eff}(T_0)$. $\Delta f_0$ is the difference between $f_0$ at measurement temperature T and $f_0$ at $T_0$, which is the minimum value of the measurement temperature, and is represented by $\Delta f_0 = f_0(T) - f_0(T_0)$. $\mu_0$ is the magnetic permeability of air. Therefore, temperature-dependent $\Delta \lambda_{eff}$ can be obtained by measuring variation in the resonant frequency $f_0$ with temperature.

If the temperatures of the dielectric rod placed in the dielectric resonator and the superconductor thin film used as the bottom plate of the resonator are maintained at a constant temperature, $\lambda$ of the superconductor thin film at a temperature of 0K, that is, $\lambda_0$, can be obtained through fitting on the basis of the results of $\Delta\lambda_{eff}$, which have been obtained by measuring variation in the resonant frequency of the resonator while changing only the temperature of the top superconductor thin film, as shown in Equation 7. FIG. 5a illustrates the results obtained by measuring the temperature dependence of $\Delta\lambda_{eff}$ for a 19.5 GHz $TE_{011}$ mode sapphire resonator having YBCO thin films installed therein and a gap enabling measurement of the penetration depth. FIG. 5a shows that, in the case of the YBCO superconductor thin films measured at a frequency of 19.5 GHz, the measured results coincide well with fitted results when the penetration depth $\lambda_0$ at 0K is 190 nm. It means that, when the intrinsic penetration depth at 0K is set to 190 nm, optimal fitted results can be obtained. Further, FIG. 5b shows that, in the case of a YBCO superconductor thin film measured at a frequency of 40 GHz, $\lambda$, measured using the 40 GHz $TE_{021}$ mode sapphire resonator, is almost the same as the absolute value of $\lambda$, measured at a frequency of 10 KHz using a mutual inductance method, over an entire temperature range. In the fitting process, the relational expression between the effective surface resistance and the intrinsic surface resistance of the superconductor thin film is also used together with Equation 7, and a detailed description thereof will be made at the following fourth step.

Fourth Step: Measurement of Intrinsic Surface Resistances of Superconductor Thin Film and Conductor Thin Film in Microwave Frequency Band First, the effective surface impedance $Z_S^{eff}(=R_S^{eff}+iX_S^{eff})$ and the intrinsic surface impedance $Z_S(=R_S+iX_S)$ of the superconductor thin film (or conductor thin film) are represented by the following Equation 8 at measurement frequency $f_0$.

$$Z_S^{eff} = R_S^{eff} + iX_S^{eff} = Z_S \frac{\beta_h - \gamma_{z3}\coth(\gamma_{z3}t)}{\beta_h \coth(\gamma_{z3}t) - \gamma_{z3}} = G_h Z_S \quad \text{[Equation 8]}$$

In this case, $G_h$ denotes a correction factor, t is the thickness of the superconductor thin film, and $\gamma_{z3}$ denotes the propagation constant of electromagnetic waves inside the superconductor thin film, wherein $\gamma_{z3}^2 = i\omega_0\mu_0\sigma$, $\sigma(=\sigma_1-i\sigma_2)$ is the complex conductivity of the superconductor thin film, $\mu_0$ is the magnetic permeability of a vacuum (air) ($=4\pi \times 10^{-7}$ Wb/A-m), and $\omega_0=2\pi f_0$ is satisfied. t is the thickness of the superconductor thin film, l is the thickness of the substrate, and $\beta_h$ is defined by $\beta_h=-\beta_{z4}\cot(\beta_{z4}l)$ (but it corresponds to the case where $\omega_0^2 \in_0 \mu_0 \in_{r4} > \beta_4^2$ is satisfied), where $\beta_{z4}$ denotes the complex propagation constant in the region of a substrate region, and $\in_{r4}$ is the dielectric constant of the substrate. Meanwhile, in the case where $\omega_0^2 \in_0 \mu_0 \in_{r4} < \beta_4^2$ is satisfied, $\beta_h=-\beta_{z4}\cot h(\beta_{z4}l)$ is realized. When the substrates grown on the superconductor thin films (region 4 and region 5) have the shapes of thin circular plates, and the portion of the substrate, other than the surfaces on which the superconductor thin films are grown, is surrounded by copper (refer to FIG. 1c), $\beta_{z4}$ is determined using the following Equation 9.

$$\omega_0^2 \varepsilon_0 \mu_0 \varepsilon_{r4} = \beta_{z4}^2 + \beta_4^2 \text{ for } \omega_0^2 \varepsilon_0 \mu_0 \varepsilon_{r4} > \beta_4^2, \quad \text{[Equation 9]}$$
$$\omega_0^2 \varepsilon_0 \mu_0 \varepsilon_{r4} = \beta_{z4}^2 - \beta_4^2 \text{ for } \omega_0^2 \varepsilon_0 \mu_0 \varepsilon_{r4} < \beta_4^2,$$
$$\beta_4 = \frac{\mu_{0m}}{d}$$

In Equation 9, $\in_0$ is the permittivity of vacuum ($=8.85\times10^{-12}C^2/N\text{-}m^2$), and $\in_{r4}$ is the dielectric constant of the substrate. Further, $\mu_{0m}$ is an m-th solution of equation $J_0'(x)=0$ for a derivative $J_0'(x)$ of the first kind of Bessel function $J_0(x)$, which applies to the case where a resonance mode is a $TE_{0mn}$ mode.

Further, an inverse number of the real number part of $\gamma_{z3}$ in Equation 8 is a value defined by $\lambda$, wherein $\sigma_2 \gg \sigma_1$ is satisfied when measurement temperature is not very close to $T_C$, thus $\gamma_{z3}$ and $\lambda$ are represented by the following Equation 10.

$$\gamma_{z3} = (i\omega_0\mu_0\sigma)^{1/2} \approx (i\omega_0\mu_0\sigma_2)^{1/2} = \frac{1}{\lambda} \quad \text{[Equation 10]}$$

Meanwhile, the relationship between $Z_S$ and $\gamma_{z3}$ (or $\sigma$) is given by the following Equation 11.

$$Z_S = R_S + iX_S = \frac{i\omega_0\mu_0}{\gamma_{z3}} = \left(\frac{i\omega_0\mu_0}{\sigma}\right)^{1/2} \quad \text{[Equation 11]}$$

Therefore, if the $\sigma$ of the superconductor thin film, that is, $\sigma_1$ and $\sigma_2$, are determined, $Z_S$ of the superconductor thin film is determined.

When measurement temperature is not very close to the critical temperature $T_C$, $X_S^{eff} \cong \text{Re}(G_h) \times X_S = G_h \times X_S$ is realized in Equation 8 (where $\text{Re}(G_h)$ is the real part of $G_h$), thus $\Delta X_S^{eff} \cong G_h \times \Delta X_S$ and $\Delta \lambda_{eff} \cong G_h \times \Delta \lambda$ are obtained. Since there are two unknown quantities in $G_h$, that is, $\beta_h$ and $\gamma_{z3}$ ($\cong 1/\lambda$), only an unknown quantity $\lambda$ remains in $G_h$ if $\beta_h$ is obtained from $\beta_{z4}$, determined in Equation 9, and an equation $\beta_h=-\beta_{z4}\cot(\beta_{z4}l)$ (or $\beta_h=-\beta_{z4}\cot h(\beta_{z4}l)$). Then, if a model equation of $\lambda$ for the YBCO superconductor thin film, that is, $\lambda=\lambda_0[1-(T/T_c)^2]^{-1/2}$, is used, only $\lambda_0$ and $T_c$ remain as unknown quantities in the relational expression $\Delta\lambda_{eff} \cong G_h \times \Delta\lambda$. Meanwhile, since $\Delta\lambda_{eff}$ values can be obtained experimentally, optimized $\lambda_0$ and $T_c$ can be obtained if least-square fitting is performed in the relational expression $\Delta\lambda_{eff} \cong G_h \times \Delta\zeta$ using $\lambda_0$ and $T_c$ as the fitting parameters. Further, $\lambda$ and $\lambda_{eff}$ can be obtained as functions of the temperature using the fitted values for $\lambda_0$ and $T_c$, and $\sigma_2$ can be obtained using the above Equation 10. If $\lambda$ is obtained, $G_h$ can be calculated using Equation 8. If temperature is not very close to $T_C$, $R_S^{eff} \cong \text{Re}(G_h) \times R_S = G_h \times R_S$ is realized and $R_S$ can be obtained from the measured $R_S^{eff}$ of the superconductor thin film. In this case, $\sigma_1$ can also be obtained from $R_S=[\sigma_1/(2\sigma_2)](\omega_0\mu_0/\sigma_1)^{1/2}$.

Meanwhile, when the measurement temperature is very close to $T_c$, $\sigma \cong \sigma_2$ is not satisfied anymore. In this case, optimal $\sigma_1$ and $\sigma_2$ corresponding to the measured $R_S^{eff}$ and $\Delta X_S^{eff}$ must be determined by performing two-parameter fitting using $\sigma_1$ and $\sigma_2$ as the fitting parameters for $R_S^{eff}$ and $\Delta X_S^{eff}$ in Equation 8. In this case, $Z_S$ of the superconductor thin film is determined using Equation 11. For reference, $T_c$ denotes the critical temperature of the superconductor, below which superconductor shows the superconductivity.

In the case of a conductor, since $\sigma=\sigma_1$ is satisfied (where $\sigma_2=0$), $\gamma_{z3}=(i\omega_0\mu_0\sigma_1)^{1/2}=(\omega_0\mu_0\sigma_1/2)^{1/2}(1+i)$ is satisfied, and $R_S=X_S=[(\omega_0\mu_0)/(2\sigma_1)]^{1/2}$ is obtained from $Z_S=i\omega_0\mu_0/\gamma_{z3}=R_S+iX_S$. In this case, only $\sigma_1$ remains as a parameter in Equation 8, thus $\sigma_1$ corresponding to the measured $R_S^{eff}$ of the conductor is determined using $\sigma_1$ as a fitting parameter, and thus $R_S$ and $X_S$ of the conductor are also determined.

FIGS. 6a and 6b illustrate the temperature dependences of the intrinsic surface resistances at a frequency of 8.5 GHz (in the case of a Pt thin film, 8.5 GHz to 9.7 GHz) for YBCO superconductor thin films and Pt thin films having different thicknesses, respectively, and FIG. 6c illustrates the temperature dependence of the intrinsic surface resistance at a frequency of 40 GHz for YBCO superconductor thin films having different thicknesses, which show that the magnitudes of intrinsic surface resistances are almost the same with each other regardless of the thicknesses of respective thin films, unlike effective surface resistances.

FIGS. 7a and 7b illustrate the temperature dependence of the average values of the intrinsic surface resistances measured at frequencies of 8.5 GHz and 40 GHz for YBCO superconductor thin films having different thicknesses, wherein the average values of the intrinsic surface resistances obtained at respective frequencies are used as calibration values required to obtain the thickness of a thin film on the basis of the effective surface resistance of the thin film. The temperature dependence of the intrinsic surface resistances obtained as calibration values for Pt thin films, having different thicknesses of 60 to 950 nm, is shown in FIG. 6b.

YBCO superconductor thin films having the same microwave characteristics are installed on the top surface and the bottom surface of the dielectric resonator, and the effective surface resistance and intrinsic surface resistance of each thin film are measured. Thereafter, one of the YBCO thin films is placed on the bottom of the dielectric and can be used as a reference thin film. In this case, the effective surface resistance of a YBCO superconductor thin film under test, having characteristics different from those of the reference thin film, is obtained using Equation 2 in consideration of the effective surface resistance of the reference thin film after $Q_0$ of the resonator is measured in a state in which the reference thin film and the YBCO superconductor thin film under test are installed as the top plate and the bottom plate of the dielectric resonator.

As shown in Equation 8, a detailed procedure for obtaining a relational expression between the effective surface resistance and the intrinsic surface resistance of a superconductor thin film or conductor thin film is described below.

For a $TE_{0mn}$ mode, the field components, other than 0, in a k-th region, is generally represented by the following Equation 12 when the origin in a coordinate system is placed on the center of the dielectric as seen in FIG. 1c.

$$H_{zk} = A_k \times q_k(\beta_{zk}z) \times \psi_k(r)$$

$$E_{\phi k} = (i\omega\mu_0/\beta_k^2) \times A_k q_k(\beta_{zk}z) \times d\psi_k/dr$$

$$H_{rk} = A_k \times dq_k(\beta_{zk}z)/dz \times d\psi_k/dr \qquad \text{[Equation 12]}$$

In this case, $E_{rk} = H_{\phi k} = 0$, k=1 to 5, $\psi_k(r)$ is a wave progressing in a radial direction, $A_k$ is a constant indicating a magnitude in a k-th region, and $\beta_{zk}$ is a propagation constant in the k-th region.

In FIG. 1c, in region 1, that is, when k=1, an field components other than 0 is represented in the following Equation 13.

$$H_{z1} = A \times J_0(\beta_1 r) \times q_1(\beta_{z1}z)$$

$$E_{\phi 1} = (i\omega\mu_0 A/\beta_1) \times J'_0(\beta_1 r) \times q_1(\beta_{z1}z)$$

$$H_{r1} = (A/\beta_1) \times J'_0(\beta_1 r) \times dq_1(\beta_{z1}z)/dz \qquad \text{[Equation 13]}$$

Further, when k=2, an field components, other than 0, is represented by the following Equation 14.

$$H_{z2} = A \times Q_0(\beta_2 r) \times q_2(\beta_{z2}z)$$

$$E_{\phi 2} = -(i\omega\mu_0 A/\beta_2) \times Q'_0(\beta_2 r) \times q_2(\beta_{z2}z)$$

$$H_{r2} = -(A/\beta_2) \times Q'_0(\beta_2 r) \times dq_2(\beta_{z2}z)/dz \qquad \text{[Equation 14]}$$

In Equations 13 and 14, $\beta_{z1} = \beta_{z2}$ and $q_1(\beta_{z1}z) = q_2(\beta_{z2}z) = \cos(\beta_{z1}z + \psi_h)$ are satisfied (where $\psi_h$ is a phase factor caused by the penetration of electromagnetic waves into the superconductor thin film). Further, $J_0(x)$ is the first kind of the 0-th order Bessel function, and a relational expression between $\beta_{zk}$ and $\beta_k$ for k=1 and 2 is given by the following Equation 15.

$$k_0^2 \in_{r1} = \beta_{z1}^2 + \beta_1^2$$

$$k_0^2 \in_{r2} = \beta_{z2}^2 - \beta_2^2 \qquad \text{[Equation 15]}$$

In Equation 15, $\in_{r1}$ and $\in_{r2}$ are the dielectric constants of the dielectric rod and region 2, respectively, $k_0$ and $\omega_0$ denote $k_0 = \omega_0 \sqrt{\in_0 \mu_0}$ and $\omega_0 = 2\pi f_0$, respectively, and $\beta_1$ and $\beta_2$ are transverse propagation constants in regions 1 and 2. Further, $Q_0(\beta_2 r)$ is given by the following Equation 16.

$$Q_0(\beta_2 r) = \qquad \text{[Equation 16]}$$
$$\frac{-\beta_2 J'_0(\beta_1 a)}{\beta_1} \times \frac{K_0(\beta_2 r) I'_0(\beta_2 d) - I'_0(\beta_2 r) K'_0(\beta_2 d)}{K_0(\beta_2 a) I'_0(\beta_2 d) - I'_0(\beta_2 a) K'_0(\beta_2 d)}$$

Therefore, when $k_0^2 \in_{r2} < \beta_2^2$, the following Equation 17 can be obtained using a boundary condition $E_{\phi 1}/H_{z1} = E_{\phi 2}/H_{z2}$ at r=a in $TE_{0mn}$ mode.

$$\frac{\beta_2 J_1(\beta_1 a)}{\beta_1 J_0(\beta_1 a)} = \frac{I_1(\beta_2 a) K_1(\beta_2 d) - I_1(\beta_2 d) K_1(\beta_2 a)}{I_1(\beta_2 d) K_0(\beta_2 a) + I_0(\beta_2 a) K_1(\beta_2 d)} \qquad \text{[Equation 17]}$$

For reference, when $k_0^2 \in_{r2} > \beta_2^2$, the modified Bessel functions $I_n$, and $K_n$ in Equation 17 are changed into Bessel functions $J_n$ and $Y_n$.

Meanwhile, if superconductor thin films having the same characteristics exist in region 3, corresponding to the top surface and the bottom surface of the dielectric resonator, and traveling waves exist in regions 4 and 5 (k=4, 5), the condition of $\beta_{z4} = -\beta_{z5}$ must be satisfied due to symmetry, and $q_k(\beta_{zk}z)$ is represented by $q_k(\beta_{zk}z) = \exp(-i\beta_{zk}z) - \Gamma_k \exp(i\beta_{zk}z)$.

In this case, $q_k'(\beta_{zk}z) = dq_k(\beta_{zk}z)/d(\beta_{zk}z)$ and $\psi_k(r) = J_0(\beta_k r)$ are satisfied, and a relational expression between $\beta_4$ and $\beta_{z4}$ is shown in the above Equation 9.

At k=3, that is, in region 3, the attenuation of electromagnetic waves is caused by the superconductor thin films, so that $q_3(\gamma_{z3}z)$ and $q_3'(\gamma_{zk}z)$ can be represented by $q_3(\gamma_{z3}z) = \sinh(\gamma_{z3}z) + \Gamma_3 \cos h(\gamma_{z3}z)$ and $q_3'(\gamma_{z3}z) = \cos h(\gamma_{z3}z) + \Gamma_3 \sin h(\gamma_{z3}z)$, respectively, if $q_3(\gamma_{z3}z)$ and $q_3'(\gamma_{zk}z)$ are represented using $\gamma_{z3}$ instead of $\beta_{z3}$, where $\gamma_{z3} = (i\omega\mu_0 \sigma)^{1/2}$. When the magnitude of a magnetic field is lower than the lower critical field $H_{C1}$ of the superconductor material in region 3, $H_{z3} = 0$ is obtained (where $\mu_0$ is the permeability of vacuum, and $\sigma = \sigma_1 - i\sigma_2$).

$\beta_4$ can be obtained from a boundary condition, in which $E_{\phi 4} = 0$ at r=d, and $E_{\phi 4} = 0$ at z=l+h/2+t are satisfied in region 4. In this case, as shown in Equation 9, $\beta_4 = \mu_{om}/d$ is obtained (where $\mu_{om}$ is defined in description related to Equation 9), and $\Gamma_4 = \exp[-\beta_{z4}(2t + 2l + h)]$ is obtained.

Meanwhile, $\Gamma_3$ is represented as shown in the following Equation 18 using a boundary condition of $E_{\phi 3}/H_{r3} = E_{\phi 4}/H_{r4}$ at z=h/2+t.

$$\Gamma_3 = \frac{(\beta_h/\gamma_{z3})\sinh\{\gamma_{z3}(h/2+t)\} - \cosh\{\gamma_{z3}(h/2+t)\}}{\sinh\{\gamma_{z3}(h/2+t)\} - (\beta_h/\gamma_{z3})\cosh\{\gamma_{z3}(h/2+t)\}} \qquad \text{[Equation 18]}$$

In Equation 18, if $\omega_0^2 \epsilon_0 \mu_0 \epsilon_{r4} > \beta_4^2$, $\beta_h = -\beta_{z4} \cot(\beta_{z4}l)$ is realized, whereas, if $\omega_0^2 \epsilon_0 \mu_0 \epsilon_{r4} < \beta_4^2$, $\beta_h = -\beta_{z4} \cot h(\beta_{z4}l)$ is realized.

The relational expression $\beta_{z1} \tan(\beta_{z1}h/2 + \psi_h) = \gamma_{z3}/G_h^*$ can be obtained using Equation 18 and a boundary condition $H_{r1}/E_{\phi1} = H_{r3}/E_{\phi3}$ at $z = h/2$, and is represented in detail by the following Equation 19 if symmetry appearing in $TE_{omn}$ mode is used.

$$\beta_{z1} \tan(\beta_{z1}h/2) = \gamma_{z3}/G_h^*, \text{ n is an odd number}$$

$$-\beta_{z1} \cot(\beta_{z1}h/2) = \gamma_{z3}/G_h^*, \text{ n is an even number} \qquad [\text{Equation 19}]$$

Equation 19 is obtained by assuming that YBCO superconductor thin films or conductor thin films used as the top plate and the bottom plate of the dielectric resonator have the same characteristics. Even though the penetration depths for the thin films are different from each other, the above Equation 19 will still be useful if the fact, that variation in the distribution of an electromagnetic field caused by different penetration depths will occur within a range of about the penetration depth, and the fact, that the height of the dielectric resonator is much greater than the penetration depth, are taken into consideration.

In Equation 19, $G_h^*$ is given by the following Equation 20.

$$G_h^* = \frac{\beta_h - \gamma_{z3}\coth(\gamma_{z3}t)}{\beta_h \coth(\gamma_{z3}t) - \gamma_{z3}} \qquad [\text{Equation 20}]$$

A relational expression between $Z_S^{eff}$ and $Z_S$ is obtained from the ratio of $E_{\phi3}$ to $H_{r3}$, and the result thereof is represented by Equation 21.

$$Z_S^{eff} = -\frac{E_{\phi3}}{H_{r3}}\bigg|_{z=h/2} = \frac{i\omega\mu_0}{\gamma_{z3}} G_h^* \qquad [\text{Equation 21}]$$

Equation 8 is obtained from Equation 20 and Equation 21. For reference, $\beta_{z1}(=\beta_{z2})$, $\beta_1$ and $\beta_2$ are determined using the above Equations 15 and 17 and the measured resonant frequency $f_0$, and $\beta_{z4}(=-\beta_{z5})$ and $\beta_4(=\beta_5)$ are determined using Equation 9. If conductor thin films are used as the top plate and the bottom plate of the dielectric resonator, the relational expression for conductor thin films between $Z_S^{eff}$ and $Z_S$ shown in Equation 8 is the same as that in the superconductor thin film, except that $\gamma_{z3} = (i\omega\mu_0\sigma)^{1/2}$ is changed into $\gamma_{z3} = (i\omega\mu_0\sigma_1)^{1/2}$.

Fifth Step: Determination of Thickness of Superconductor Thin Film and Conductor Thin Film in Microwave Band FIGS. 8a to 8e illustrate the results obtained by measuring the thicknesses of provided YBCO superconductor thin films using an α-step profilometer according to an embodiment of the present invention. FIGS. 9a and 9b illustrate the results obtained by measuring the thicknesses of two of the provided Pt conductor thin films using an α-step profilometer according to an embodiment of the present invention. Further, FIG. 10a and 10b are graphs showing the comparison of the results obtained by measuring the thicknesses of YBCO superconductor thin films and Pt conductor thin films using an α-step profilometer or TEM, with the results obtained by measuring the thicknesses using a rutile resonator through the method disclosed in the present invention. FIG. 10a shows that the difference between two thickness values of the YBCO superconductor thin film measured at measurement temperatures of 30K and 77K is within ∓5%. FIG. 10b shows that the difference between two thickness values of Pt conductor thin films having thicknesses of 60 to 950 nm measured at a normal room temperature using the same rutile resonator is within ∓2%. FIG. 10c illustrates the results obtained by measuring the thicknesses of YBCO superconductor thin films at temperatures of 10 K, 30 K, 50 K, and 77 K using a sapphire resonator, and shows that the thicknesses are obtained by causing $R_S^{eff}$ measured at respective temperatures, to correspond to an $R_S^{eff}$ versus thickness curve (indicated by the dots), which is obtained using Equation 8 for respective temperatures, using the calibrated $R_S$ of a YBCO thin film at a frequency of 40 GHz (refer to FIG. 7b). It can be seen that, generally, the thicknesses measured at temperatures of 10 K, 30 K, 50 K, and 77 K are arranged to be collinear. As shown in FIG. 10d, the difference between the measured thicknesses and the results measured using an α-step profilometer is within ∓5%. Further, FIGS. 10e and 10f illustrate the comparison of the results obtained by measuring the thicknesses of Pt thin films having thicknesses of 9 nm to 950 nm at temperatures ranging from 10K to 300 K using a 40 GHz sapphire resonator, with thicknesses measured using an α-step profilometer (60 nm to 950 nm) and TEM (9 nm and 35 nm). It can be seen that values measured for the Pt thin films having thicknesses of 470 nm and 950 nm are very high in a low temperature region. The reason for this is that, when the temperature is low, the penetration depth for the Pt thin films decreases, so that the thickness dependence of the effective surface resistance appears to be very low in Pt thin films having thicknesses equal to or greater than a certain thickness. Such a problem can be solved by reducing frequency. It can be proven that such an analysis is reasonable through FIG. 10b, showing the results measured at a frequency of 8.5 GHz In order to prove that the present invention is also efficient in measuring the thickness of a conductor thin film, the thickness of which is too thin to measure using an α-step profilometer, a Pt thin film having a very small thickness is grown, and the thickness of the Pt thin film is measured at a microwave frequency of 9.7 GHz through the above first to fifth steps. As a result of the measurement of thickness, it can be proven that the thickness is 31.3 nm. FIG. 11a illustrates the results obtained by measuring the thickness of a Pt thin film, which is grown under the same conditions, using an α-step profilometer. It can be seen that the measured thickness value is 35∓5 nm, and that the two measured thicknesses are identical to each other within the measurement uncertainty. FIG. 11b illustrates the results obtained by measuring the thickness of the same Pt thin film using TEM, and shows that the measured thickness is about 35 nm and has a difference of about 10% with respect to the thickness measured at a frequency of 9.7 GHz. FIG. 11c illustrates measured results for the thinnest one of provided Pt thin films. The fact that thicknesses of 7.5 nm to 10.4 nm, which are values measured using TEM, are very nearly identical to thicknesses of 8 nm to 10.4 nm, which are values measured using a 40 GHz sapphire resonator, means that the thickness of a superconductor thin film or conductor thin film, which is very thin, can be more precisely measured using measurement technology in a microwave region.

INDUSTRIAL APPLICABILITY

According to the present invention, there is an advantage in that it measures the thicknesses of a conductor thin film, a superconductor thin film, a superconductor-coated conductor, the thicknesses of which cannot be measured using ellipsometry, in a microwave frequency band using a non-invasive measurement method, thus enabling research into the inherent characteristics and applicability of such materials, and the management of the quality thereof.

Further, the present invention can manage the quality of elements and devices manufactured using high temperature superconductor thin films used to manufacture microwave filters for mobile communication and SQUID, and high temperature superconductor-coated conductors used to transmit power and manufacture magnets.

The invention claimed is:

1. A method of measuring thickness of a thin film using microwaves, comprising:
    a first step of measuring a Q-factor of a dielectric resonator using a separate network analyzer;
    a second step of determining an effective surface resistance of a superconductor thin film and a loss tangent (tan δ) of a dielectric using the Q-factor of the dielectric resonator measured at the first step;
    a third step of measuring the electromagnetic wave penetration depth for the superconductor thin film while temperatures of a superconductor thin film placed on a bottom surface of the dielectric resonator and the dielectric are maintained at a constant temperature, and only the temperature of the superconductor thin film used as the top plate of the resonator can be changed;
    a fourth step of calculating an intrinsic surface resistance of the superconductor thin film for calibration using the effective surface resistance determined at the second step and the electromagnetic wave penetration depth for the superconductor measured at the third step; and
    a fifth step of measuring a thickness of a superconductor based on the effective surface resistance of the superconductor, using a calibrated value of the intrinsic surface resistance of the superconductor thin film determined at the fourth step.

2. The method according to claim 1, wherein the dielectric is made of sapphire or rutile.

3. The method according to claim 1, wherein the dielectric resonator is a dielectric resonator having a $TE_{011}$ mode, a $TE_{021}$ mode and a $TE_{012}$ mode.

4. The method according to claim 1, wherein the superconductor is a high temperature Yttrium Barium Copper Oxide (YBCO) superconductor, and the conductor is platinum (Pt).

* * * * *